United States Patent
Fong et al.

(10) Patent No.: US 12,051,254 B2
(45) Date of Patent: Jul. 30, 2024

(54) TYPING BIOLOGICAL CELLS

(71) Applicant: TruTag Technologies, Inc., Kapolei, HI (US)

(72) Inventors: Alexandre Fong, Orlando, FL (US); Guocai Shu, Pleasanton, CA (US); Jai Hebel, Emeryville, CA (US)

(73) Assignee: Hinalea Imaging Corp., Emeryville, CA (US)

( * ) Notice: Subject to any disclaimer, the term of this patent is extended or adjusted under 35 U.S.C. 154(b) by 320 days.

(21) Appl. No.: 17/728,726

(22) Filed: Apr. 25, 2022

(65) Prior Publication Data

US 2022/0351005 A1    Nov. 3, 2022

Related U.S. Application Data

(60) Provisional application No. 63/181,945, filed on Apr. 29, 2021.

(51) Int. Cl.
G06V 20/69    (2022.01)
G06F 18/24    (2023.01)
G06F 18/25    (2023.01)

(52) U.S. Cl.
CPC ............ *G06V 20/698* (2022.01); *G06F 18/24* (2023.01); *G06F 18/253* (2023.01)

(58) Field of Classification Search
CPC ...... G06V 20/698; G06F 18/24; G06F 18/253
See application file for complete search history.

(56) References Cited

U.S. PATENT DOCUMENTS

| 2018/0196246 A1* | 7/2018 | Bares .................. G01J 3/0208 |
| 2019/0065817 A1 | 2/2019 | Mesmakhosroshahi |
| 2020/0158641 A1 | 5/2020 | Fan |

\* cited by examiner

*Primary Examiner* — Casey L Kretzer

(57) ABSTRACT

A system for typing biological cells includes a tunable Fabry-Perot etalon, and imaging sensor, and a processor. The imaging sensor acquires one or more images of one or more biological cells from light transmitted through the tunable Fabry-Perot etalon. Each image represents signal associated with one or more wavelengths transmitted through the tunable Fabry-Perot etalon. The processor is configured to determine a type of each of the one or more biological cells. Determining the type uses a machine learning algorithm and is based at least in part on one or more of an image segmentation, a patch extraction, a feature extraction, a feature compression, a deep feature extraction, a feature fusion, a feature classification, and a prediction map reconstruction.

20 Claims, 12 Drawing Sheets

TYPING BIOLOGICAL CELLS

CROSS REFERENCE TO OTHER APPLICATIONS

This application claims priority to U.S. Provisional Patent Application No. 63/181,945 entitled SYSTEM FOR PATHOGEN DETECTION filed Apr. 29, 2021 which is incorporated herein by reference for all purposes.

BACKGROUND OF THE INVENTION

Contamination of food products from common biological pathogens (e.g., *Salmonella, Campylobacter*, and *Escherichia coli*) is a serious health issue world-wide. Conventional detection methods for evaluating such threats are time consuming (e.g., often requiring one or more days), which increases both the cost and severity of outbreaks.

While several technologies utilized in foodborne pathogen detection have merit, they require a critical volume of cell material needed to react with an analyte. This lengthy wait can create public health crises bottlenecks in the supply chain that adversely impact operating cycles and increase inventory management costs.

The development of multi and hyperspectral imaging technologies have introduced new possibilities in optical based detection and identification. However, technologies such as push-broom grating and acousto-optic tunable filters have been limited in their ability to capture the data in a timely manner with the required spectral resolution and spatial uniformity and resolution.

BRIEF DESCRIPTION OF THE DRAWINGS

Various embodiments of the invention are disclosed in the following detailed description and the accompanying drawings.

DETAILED DESCRIPTION

Figure 1:
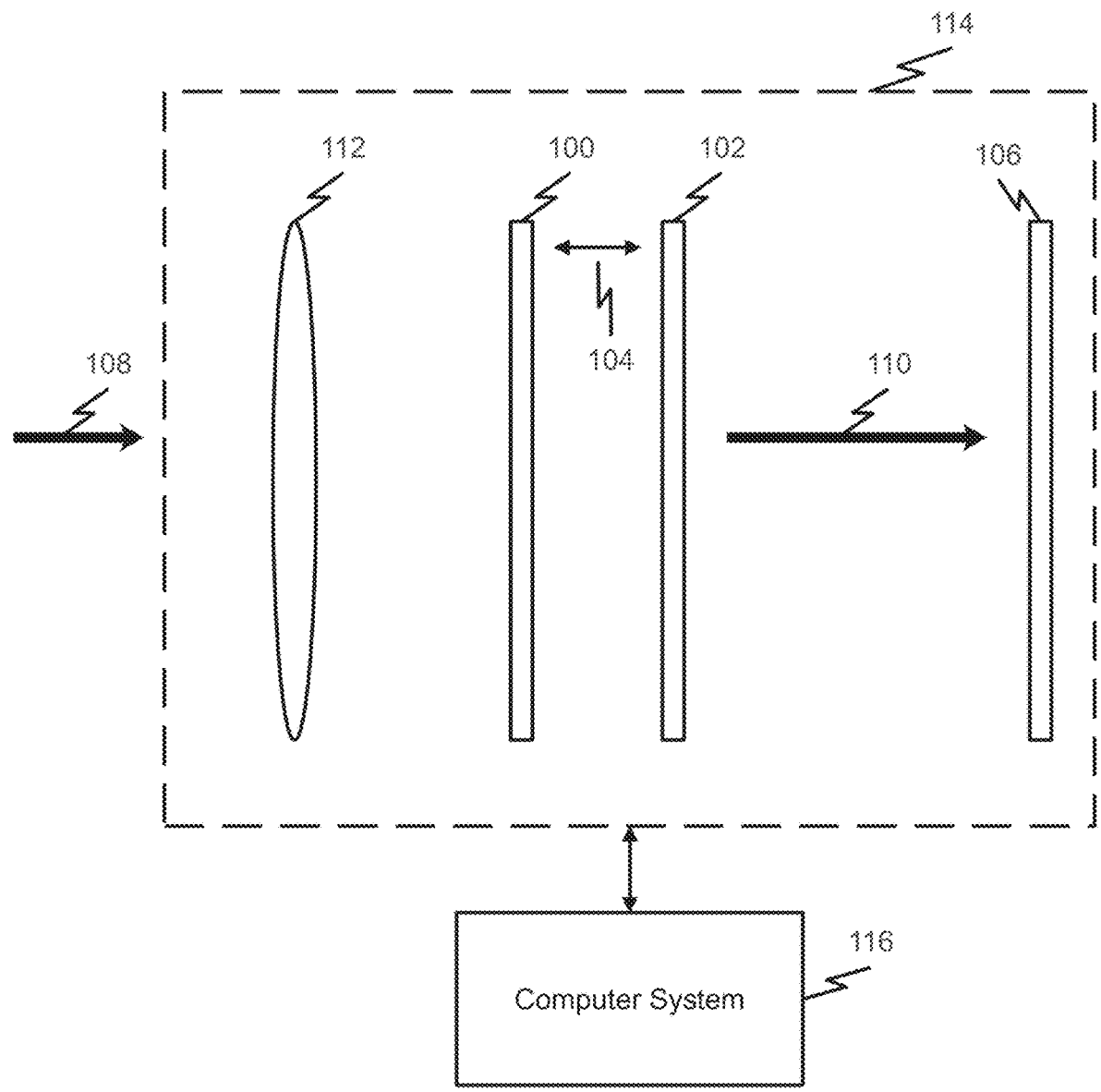
FIG. 1 is a diagram illustrating an embodiment of a Fabry-Perot tunable etalon interferometer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for typing biological cells field is disclosed. The system comprises a tunable Fabry-Perot etalon, an imaging sensor, and a processor. The imaging sensor acquires one or more images of one or more biological cells from light transmitted through the tunable Fabry-Perot etalon. Each image represents signal associated with one or more wavelengths transmitted through the tunable Fabry-Perot etalon. The processor is configured to determine a type of each of the one or more biological cells. Determining the type of the one or more biological cells uses a machine learning algorithm. The machine learning algorithm is based at least in part on one or more of an image segmentation, a patch extraction, a feature extraction, a feature compression, a deep feature extraction, a feature fusion, a feature classification, and a prediction map reconstruction.

An integrated, self-contained system for rapid detection and identification of biological cell types (e.g., food borne pathogens, bacteria or other germs on various items or surfaces, etc.) is disclosed. The system comprises a Fabry-Perot etalon, a broadband illumination system, an imaging sensor, focusing optics, sample fixturing, and a data acquisition and processing computer platform In various embodiments, the system comprises automated sample loading, scanning, analysis, and/or biological cell identification to improve the ability to detect and identify biological cell types (e.g., pathogenic cell types) in a sparsely populated field of view while reducing the time to answer and making the system easy to use.

In various embodiments, the system is integrated into an in-line inspection system (e.g., in food processing facilities), wherein samples are collected for analysis (e.g., by swabbing directly from the product surface or siphoned from wash/rinse water). In some embodiments, the system is integrated into a distributed computing and communications environment.

Light from the broadband illumination system projects an image of the sample via the focusing optics through the tunable Fabry-Perot etalon onto the imaging sensor. The imaging sensor renders a digital image which is captured by the processing computer.

The imaging sensor is used to collect one or more band-passes transmitted through the sample to generate a hyperspectral data cube (also known as a hypercube), whereby each frame in the series of images represents the image at a single band-pass (e.g., a band-pass comprising one or more wavelengths that pass through a filter—for example a Fabry-Perot etalon at a specific gap setting).

A hypercube is a three-dimensional representation of the captured data whereby the two dimensions of the image's spatial components (x, y coordinates) are augmented by the wavelength in the third dimension. The number of band-passes required for a given data cube varies depending upon the resolution of the spectral signature required to differentiate between species and serotypes. For closely similar biological cells, this can range to the hundreds of band-passes required. Additionally, such data cubes can be very large files (e.g., 1 GB, 2 GB, etc.).

In the disclosed system, the mirror separation of the tunable Fabry-Perot etalon is adjusted to collect single images of the illuminated sample area for multiple band-passes. Each band-pass image comprises an interferogram to which a mathematical transform is applied (e.g., a mathematical transform applied via a reconstruction matrix). The transform converts the interferogram image into wavelength intensities for the individual band-passes and a mathematical calibration is applied to match the interferogram images to the correct wavelengths.

One or more calibrated images of biological cells are segmented before passing to a classification algorithm (e.g., a cell labeling or typing algorithm). Pixels representing biological cells are segmented from the image background and a binary segmentation mask is output for each image.

Using the binary segmentation mask, the relevant pixels are selected to outline a cell or cell cluster, background pixels are zeroed out, and the image is cropped down to a small patch that covers exactly the area of the cell or cell cluster.

Feature extraction empirically determines morphological features of interest (e.g., size, shape, and intensity distribution of illumination) to extract from each cell patch in order to generate a list of metrics for each cell patch. For example, feature metrics deemed significant criteria for identification and the associated statistical thresholds for each have been established as indicating significance are used to generate a list of metrics for each cell patch. For example, features are manually determined by a human user to generate a list of metrics for each cell patch.

Feature compression is used to compress hyperspectral bands in order to reduce data size while maximizing information. The resultant compressed version of the original cell patch reduces training and prediction times, as well as reducing computer memory requirements.

Deep feature extraction is used to extract additional morphological cell features (e.g., latent cell features) through deep learning methods. For example, latent cell features comprise features, patterns, and differences that are not obvious or discernable by human interrogation but that the deep learning methods determine are significant. Additional features of interest can be extracted using deep supervised learning to generate morphological features that are difficult and expensive to manually encode, as well as latent features embedded in the data.

Feature fusion generates a list of combined features for each patch by appending the empirically determined features to a list of extracted features generated from the deep feature extraction process.

Feature classification uses a deep supervised learning model to classify the biological cell type. Patch features of cell images are passed to a residual neural network classification algorithm (e.g., a ResNet-based classification algorithm) and trained against biological cell classes to produce a class prediction model.

Prediction map reconstruction tracks where each patch is located within an image (e.g., using x,y coordinates). A reconstructed prediction map is used when predicting (i.e., classifying) patches within new images. In some embodiments, individual cell classifications are compiled for each image to generate a reconstructed segmentation map.

Once trained, these algorithms can be used to recognize, identify, and mathematically group spectral and spatial characteristics associated with specific biological serotypes of interest in an unknown sample. Such characteristics include, for example, spectral profiles, spectral signatures, the shape and size of the imaged biological cell, etc.

The above algorithms have demonstrated the ability to distinguish a variety of common pathogens including *Salmonella, Campylobacter, Escherichia coli* (*E. coli*), *Staphylococcus aureus* (*S. aureus*), *Listeria innocua* (*L. innocua*), *Listeria monocytogenes* (*L. monocytogenes*), and other by serotype based on spatial and spectral characteristics.

In some embodiments, a composite image is generated from the processed image data. In some embodiments, the composite image provides an indication of the presence of a biological cell species and/or its loading (e.g., providing an immediately actionable indication). In some embodiments, a threshold based on statistical likelihood is applied to provide a binary answer or response (e.g., a false-color image, "go/no go" flags or warnings, etc.).

In various embodiments, biological cell classification is based on morphology (i.e., shape) and/or intensity images (i.e., distribution of brightness). In some embodiments, the algorithms utilize both spectral and spatial (e.g., shape and size) characteristics in their training. Typical cell shapes comprise squamous (i.e., thin, flat, scaly), cuboidal (i.e., squarish-looking), columnar (i.e., taller than wide), polygonal (i.e., irregularly angular shapes, multiple sides), stellate (i.e., star-like), spheroid to ovoid (i.e., round to oval), discoid (i.e., disc-shaped), fusiform (i.e., thick in middle, tapered toward the ends), and fibrous (i.e., thread-like).

In some embodiments, cells in the sample are stained (e.g., to provide additional contrast, to selectively stain sub-cellular organelles, to selectively stain specific types of cells more than other cell types, etc.). In various embodiments, stains comprise fluorescent and non-fluorescent dyes, fluorescent ion indicators, ionophores, fluorescent ligands that target G protein coupled receptors (GPCRs), or any other appropriate type of stain, dye, or other contrast agent.

In various embodiments, one or more neural network models are trained using hierarchical feature learning (i.e., 'layered learning'). For example, the first layers of the neural network model are trained to learn representations of basic (low-level) features, such as edges. Further down the network, layers output representations of more specific features, corresponding to parts of the object (e.g., cilia, sub-cellular organelles, etc.). After the last layer, the representations are high-level and allow a clear separation between different objects with the network having learned to distinguish among the different classes.

In various embodiments, the one or more neural network models are trained using hyperspectral data (e.g., hyperspectral data from biological cells detected by a bounding box model). In various embodiments, the one or more neural network models are trained to match the observed hyperspectral data with a library of hyperspectral data corresponding to known biological cells. In various embodiments, the output of the one or more neural network models provides the class label of an identified biological cell type (e.g., to a system user). In various embodiments, the provided class label of an identified biological cell includes related metadata (e.g., time and date, a level of confidence, the number and/or density of the identified biological cells, a plot or graph of the associated hyperspectral data, etc.).

In various embodiments, wherein the specimens presented are sparsely distributed, methods for anomaly detection and targeting at the pixel and sub-pixel scale based on statistical and machine learning algorithms are used to rapidly locate and identify individual cells. Sparsely distributed specimens may be due to low cell concentrations in the sample (e.g., due to a lack of cells, or short incubation, enrichment, or maturation periods). In various embodiments, high-speed targeting algorithms utilized in defense and remote sensing/surveillance applications are used to automate the targeting and identification of biological cells in a sparsely populated field of view. For example, airborne remote-sensing signal processing techniques, machine-learning techniques for anomaly detection, and/or orthogonal projection techniques are used to improve the speed and accuracy of the classification algorithms.

In some embodiments, samples for identification of biological cell types are collected in a liquid media. In some embodiments, the system can analyze an unprepared extracted liquid sample. In some embodiments, the samples comprise pathogenic biological cells (e.g., *Salmonella, Campylobacter, E. coli, S. aureus, L. innocua, L. monocytogenes*, etc.). In some embodiments, samples are incubated for eight hours and transferred to plate media for colonies to be extracted and placed on slides. In various embodiments, samples are incubated for one hour, two hours, three hours, four hours, or any appropriate amount of time required to sufficiently enhance the sample density. In some embodiments, (e.g., in food processing), a centrifuge is integrated into the process to increase cell concentration in fluid suspension samples prior to introduction of the sample onto a microscope slide for imaging.

In some embodiments, the system utilizes a tunable Fabry-Perot etalon with an imaging sensor as a band-sequential hyperspectral imaging filter in a darkfield microscope configuration for interrogation of the sample. In some embodiments, the system utilizes machine learning clustering algorithms trained on darkfield hyperspectral images of known biological cell types.

The system addresses limitations of other hyperspectral technologies (e.g., as utilized in a dark field configuration) for biological cell detection and identification by capturing the data from samples with varying cell concentrations in a timely manner with the required spectral resolution, spatial uniformity, and resolution.

The system utilizes front-staring imaging comprising a Fabry-Perot etalon, a broadband illumination system, an imaging sensor, focusing optics (e.g., a microscope), a sample fixture (e.g., mounted on a scanning stage), and a data acquisition and processing computer platform utilizing one or more deep machine learning algorithms. In some embodiments, the system utilizes a scanning stage (e.g., a computer-controlled scanning stage, a piezo-actuated stage, etc.). In some embodiments, the system utilizes one or more optics that provide a large field of view (e.g., a mesolens). In some embodiments, the system utilizes optics with a large numerical aperture (NA) (e.g., an NA of 0.4, 0.5, 0.6, 0.8, etc.). In various embodiments, the system utilizes a darkfield microscope configuration, a fluorescence microscope configuration, a phase-contrast microscope configuration, or any other appropriate microscope configuration for imaging of the sample.

FIG. 1 is a diagram illustrating an embodiment of a Fabry-Perot tunable etalon interferometer (FPI). In the example shown, FPI 114 based hyperspectral imager confers significant advantages by enabling the capture of high spectral resolution, high spatial resolution, and wide spectral range without polarization dependence.

In the example shown, a Fabry-Perot etalon is typically comprised of two semi-reflective mirrors (mirror 100 and mirror 102) arranged parallel to one another. Light 108 from a source enters through one side of the mirror pair (e.g., mirror 100). In some embodiments, light 108 is shaped using optics 112. At various periodic spacings or gaps (gap spacing 104), the constructive and destructive interference result in specific wavelength band-passes, single or multiple, to exit (e.g., light 110) through the other mirror (e.g., mirror 102). By varying gap spacing 104 over a range of spacings and capturing the output with image sensor 106 at different exposures, a data or hyper cube containing the spectra for each pixel in the image can be collected. Computer system 116 receives data from image sensor 106 to process for determining a biological cell type. In some embodiments, computer system 116 is used for controlling an illumination source for a target (e.g., a narrowband illumination source, a broadband illumination source, a monochromator, etc.)—for example, turning the source on and/or off, selecting a wavelength or set of wavelengths, selecting an intensity or set of intensities, etc. In some embodiments, computer system 116 is able to set a gap spacing or a set of gap spacings. In some embodiments, computer system 116 provides an interface to a user for control of the illumination or set of illuminations, of the gap spacing or a set of gap spacings, of the image collection or set of image collections, the type of pathogen or biological cell of interest, etc.

The transmission or throughput of the etalon system (e.g., light 110 at the output compared to light 108 at the input) is a function of the reflectance coatings utilized and the order of the interference band passes transmitted. The etalon's resolution is also directly proportional to the reflectance, and as such, a compromise between resolution and transmission must be made.

Due to practical constraints in achieving certain narrow and wide etalon spacings, while maintaining the required parallelism and obtaining sufficient signal to noise, operating in only single bandpass gap spacings limits the usable spectral range of FPI 114. In order to expand the useable range, schemes are used that exploit the collection of multiple band passes. Using a multiple channel image sensor, such as a color sensor, facilitates a means to solve for the individual band passes.

Such methods require the capture of all the gap spacings for the full range which can be time consuming in terms of the image capture. To expedite the process, the range of gap spacings can be restricted, and/or the instrument configured to decrease the number of gaps captured while still ensuring enough band-passes are captured over the entire range of interest. This approach requires the compromise of a loss of potentially critical information. The implementation also requires a priori determination of the spacings and thus is not dynamically adjustable.

In some embodiments, image sensor 106 of FPI 114 based hyperspectral imager is used to acquire one or more images of one or more biological cells illuminated by light transmitted through mirror 100 and mirror 102 (i.e., a tunable Fabry-Perot etalon). In some embodiments, each image represents signal associated with one or more wavelengths transmitted through (i.e., filtered by) the tunable Fabry-Perot etalon (e.g., one or more wavelengths as selected by controlling the gap spacing 104 between mirror 100 and mirror 102). In some embodiments, the processor of computer system 116 is used to determine a type of each of the one or more biological cells, wherein determining the type uses a machine learning algorithm, and wherein determining the type is based at least in part on one or more of an image segmentation, a patch extraction, a feature extraction, a feature compression, a deep feature extraction, a feature fusion, a feature classification, and a prediction map reconstruction. In some embodiments, the processor of computer system 116 utilizes one or more of the following machine learning algorithms to determine the type: a neural network model, a bounding box model, a clustering algorithm, or a classifier algorithm.

Figure 2:
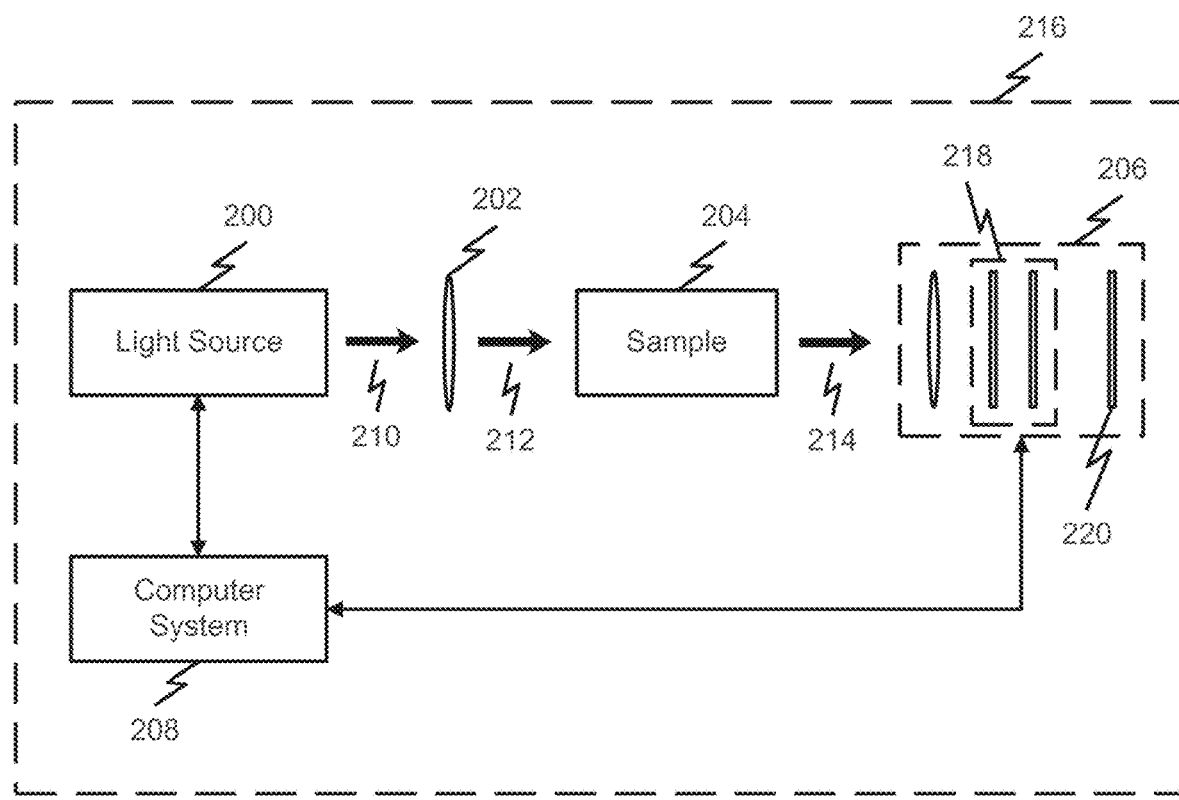
FIG. 2 is a diagram illustrating an embodiment of a system for acquiring one or more images of a sample.

FIG. 2 is a diagram illustrating an embodiment of a system for acquiring one or more images of a sample. In the example shown, hyperspectral imaging system 216 comprises light source 200, optics 202, sample 204, FPI 206, and computer system 208. In some embodiments, FPI 114 of FIG. 1 is used to implement FPI 206 of FIG. 2.

FIG. 2 also illustrates the mechanism by which hyperspectral image data can be captured using tunable Fabry-Perot etalon 218. By varying the distance (i.e., the gap) between parallel mirrors in tunable Fabry-Perot etalon 218, a combination of constructive and destructive interference from light transmitted through a sample results in only specific band-passes being transmitted. The light from the illuminated sample projects an image via focusing optics through tunable Fabry-Perot etalon 218 which modulates its mirror separation distance and onto imaging sensor 220. Imaging sensor 220 renders a digital image which is captured by computer system 208.

In the example shown, light 214 is detected by FPI 206 (e.g., detected by imaging sensor 220 of FPI 206). Light 214 is detected at multiple gap spacings of mirrors of tunable Fabry-Perot etalon 218. The intensity profiles generated by detecting the light at multiple gap spacings are useful to determine a rendering or reconstruction of a hypercube comprising a stack of image exposures each with the intensities for a given band-pass in wavelength space.

In the example shown, light source 200 generates light 210 that is passed through optics 202. In various embodiments, light 210 comprises broadband light, narrowband light, coherent light, incoherent light, collimated light, focused light, or any other appropriate type of light. In various embodiments, optics 202 is used to shape light 210 (e.g., to illuminate sample 204 with shaped light 212). Light 214, after having passed through sample 204, enters FPI 206. FPI 206 is adjusted (e.g., via instructions from computer system 208) to allow transmission of one or more narrow passband wavelengths (e.g., by adjusting the gap spacing between mirrors of tunable Fabry-Perot etalon 218) in order to acquire one image exposure of sample 204. For example, narrow passband wavelengths with peaks at 418.9 nm, 481.4 nm, 571.0 nm, 706.7 nm, and 936.7 nm (or any other narrow passband wavelengths as determined by the gap setting of mirrors of tunable Fabry-Perot etalon 218), are transmitted to acquire a single image exposure of sample 204 by image sensor 220 of FPI 206. In various embodiments, image sensor 220 comprises a solid-state sensor, a CMOS sensor, a CCD sensor, a staring array, an RGB sensor, an IR sensor, a Bayer pattern color sensor, a multiple band sensor, or a monochrome sensor. In some embodiments, mirrors of tunable Fabry-Perot etalon 218 of FPI 206 are located before sample 204.

In some embodiments, computer system 208 is used for controlling and/or coordinating the measurement. For example, computer system 208 is able to indicate turning light source 200 on or off, indicate setting a gap spacing for FPI 206, indicate acquiring an image using image sensor 220 of FPI 206, receive data from FPI 206 (e.g., image data, gap data, etc.), from a broadband source (e.g., on/off status, etc.), display an interface, receive commands, or any other appropriate function for computer system 208 in making a measurement.

In some embodiments, hyperspectral imaging system 216 is configured into a compact, self-contained, battery-operable, portable version for use in the field (e.g., in remote operating environments). In various embodiments, hyperspectral imaging system 216 includes thermal and/or ingress protection.

In some embodiments, image sensor 202 of FPI 206 based hyperspectral imager is used to acquire one or more images of sample 204 (e.g., one or more biological cells) illuminated by light transmitted through tunable Fabry-Perot etalon 218 (i.e., mirrors comprising tunable Fabry-Perot etalon 218). In some embodiments, each image represents signal associated with one or more wavelengths transmitted through (i.e., filtered by) tunable Fabry-Perot etalon 218 (e.g., one or more wavelengths as selected by controlling the gap spacing between mirrors of tunable Fabry-Perot etalon 218). In some embodiments, the processor of computer system 208 is used to determine a type of each of the one or more biological cells, wherein determining the type uses a machine learning algorithm, and wherein determining the type is based at least in part on one or more of an image segmentation, a patch extraction, a feature extraction, a feature compression, a deep feature extraction, a feature fusion, a feature classification, and a prediction map reconstruction. In some embodiments, the processor of computer system 208 utilizes one or more of the following machine learning algorithms to determine the type: a neural network model, a bounding box model, a clustering algorithm, or a classifier algorithm.

Figure 3:
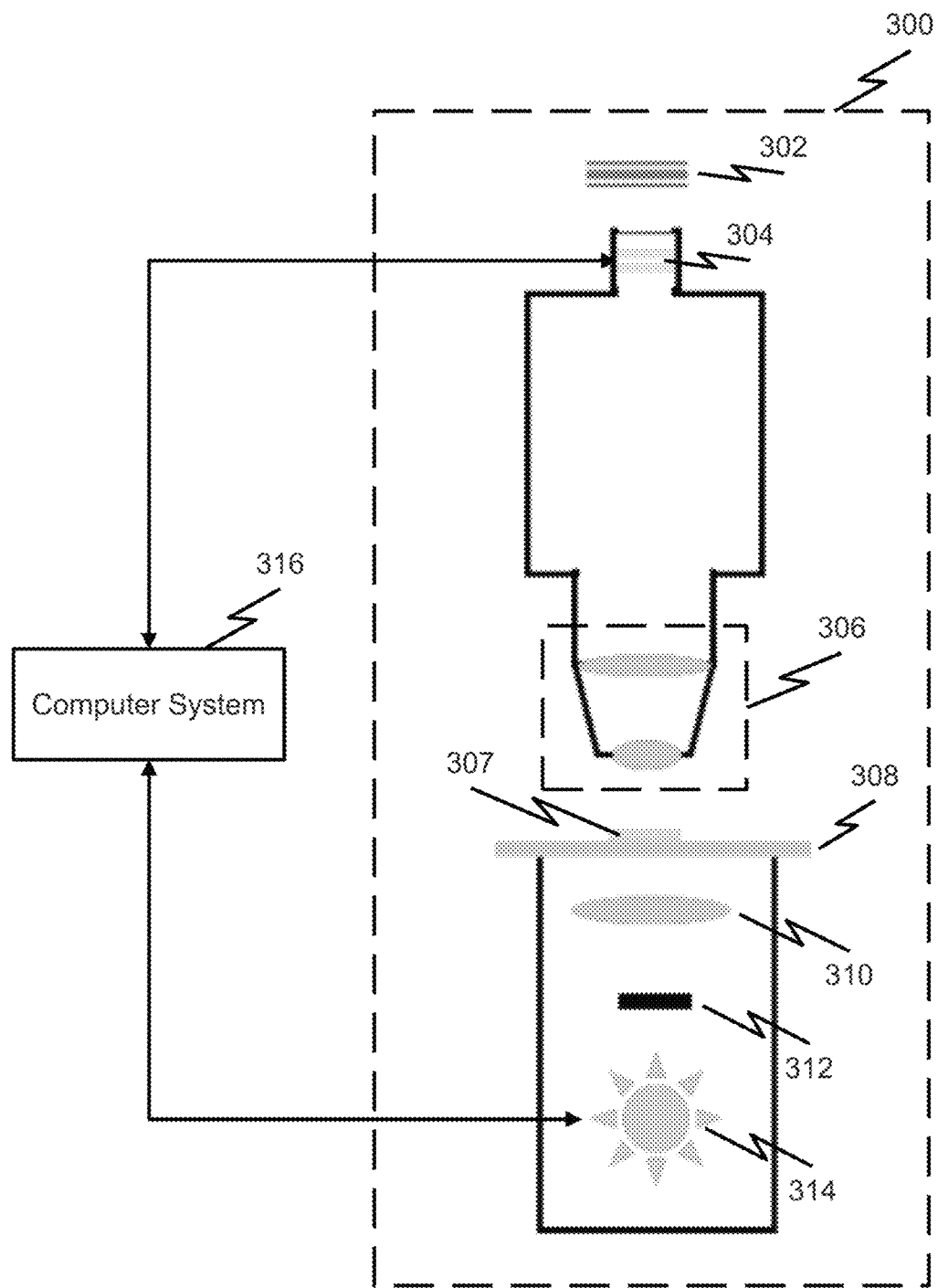
FIG. 3 is a diagram illustrating an embodiment of a system for acquiring one or more images of biological cells.

FIG. 3 is a diagram illustrating an embodiment of a system for acquiring one or more images of biological cells. In some embodiments, hyperspectral imaging microscope 300 and computer system 316 of FIG. 3 are used to implement hyperspectral imaging system 216 of FIG. 2. In various embodiments, hyperspectral imaging microscope 300 utilizes a darkfield microscope configuration, a fluorescence microscope configuration, a phase-contrast microscope configuration, or any other appropriate microscope configuration for imaging the sample.

In the example shown, a system for hyperspectral imaging microscope 300 when in use comprises imaging sensor 302, tunable Fabry-Perot etalon 304, microscope objective 306, sample 307, microscope slide 308, condenser lens 310, dark field stop 312, and illumination source 314. In various embodiments, hyperspectral imaging microscope 300 comprises a single integrated microscope platform or body, individually mounted components (e.g., mounted on an optical bench), or any other appropriate combination of mounting components in order to function together as a hyperspectral imaging microscope.

In some embodiments, computer system 316 is used to operate hyperspectral imaging microscope 300. For example, computer system 316 is able to indicate turning light source 314 on or off, indicate setting a gap spacing for tunable Fabry-Perot etalon 304, indicate acquiring an image using image sensor 302, receive data from hyperspectral imaging microscope 300 (e.g., image data, gap data, light source on/off status etc.), display an interface, receive commands, or any other appropriate function for computer system 316 in making a hyperspectral image measurement.

In the example shown, hyperspectral imaging microscope 300 depicts the illumination and focusing optical system required for the capture of dark field hyperspectral images of sample 307. A dark field image, comprised of only scattered light from sample 307, is obtained by using dark field stop 312 in front of illumination source 314 and after being focused on sample 307 using condenser lens 310. Dark field stop 312 creates a hollow light cone comprised of only oblique rays. The combined numerical aperture of condenser lens 310 and illumination source 314 (e.g., a numerical aperture of ~1.2) is chosen such that light rays entering microscope objective 306 exceed the acceptance angle of microscope objective 306. For example, microscope objective 306 has a numerical aperture of 0.4, 0.6, 0.8, 0.85, or any other appropriate numerical aperture. In this example, light rays directed towards sample 307 do not enter microscope objective 306 unless they scatter from the sample. The resulting observed image is a bright outline of items of sample 307 due to the item's index of refraction against a dark background. In various embodiments, dark field objectives with magnifications ranging from 10×-100× are used to image items of sample 307. For example, most foodborne pathogens or bacteria collected from various surfaces are observable using magnifications ranging from 10×-100×.

In some embodiments, image sensor 302 is used to acquire one or more images of sample 307 (e.g., one or more biological cells) illuminated by light from illumination source 314 transmitted through tunable Fabry-Perot etalon 304. In some embodiments, each image represents signal associated with one or more wavelengths transmitted through (i.e., filtered by) tunable Fabry-Perot etalon 304. In some embodiments, the processor of computer system 316 is used to determine a type of each of the one or more biological cells, wherein determining the type uses a machine learning algorithm, and wherein determining the type is based at least in part on one or more of an image segmentation, a patch extraction, a feature extraction, a feature compression, a deep feature extraction, a feature fusion, a feature classification, and a prediction map reconstruction. In some embodiments, the processor of computer system 316 utilizes one or more of the following machine learning algorithms to determine the type: a neural network model, a bounding box model, a clustering algorithm, or a classifier algorithm.

Figure 4:
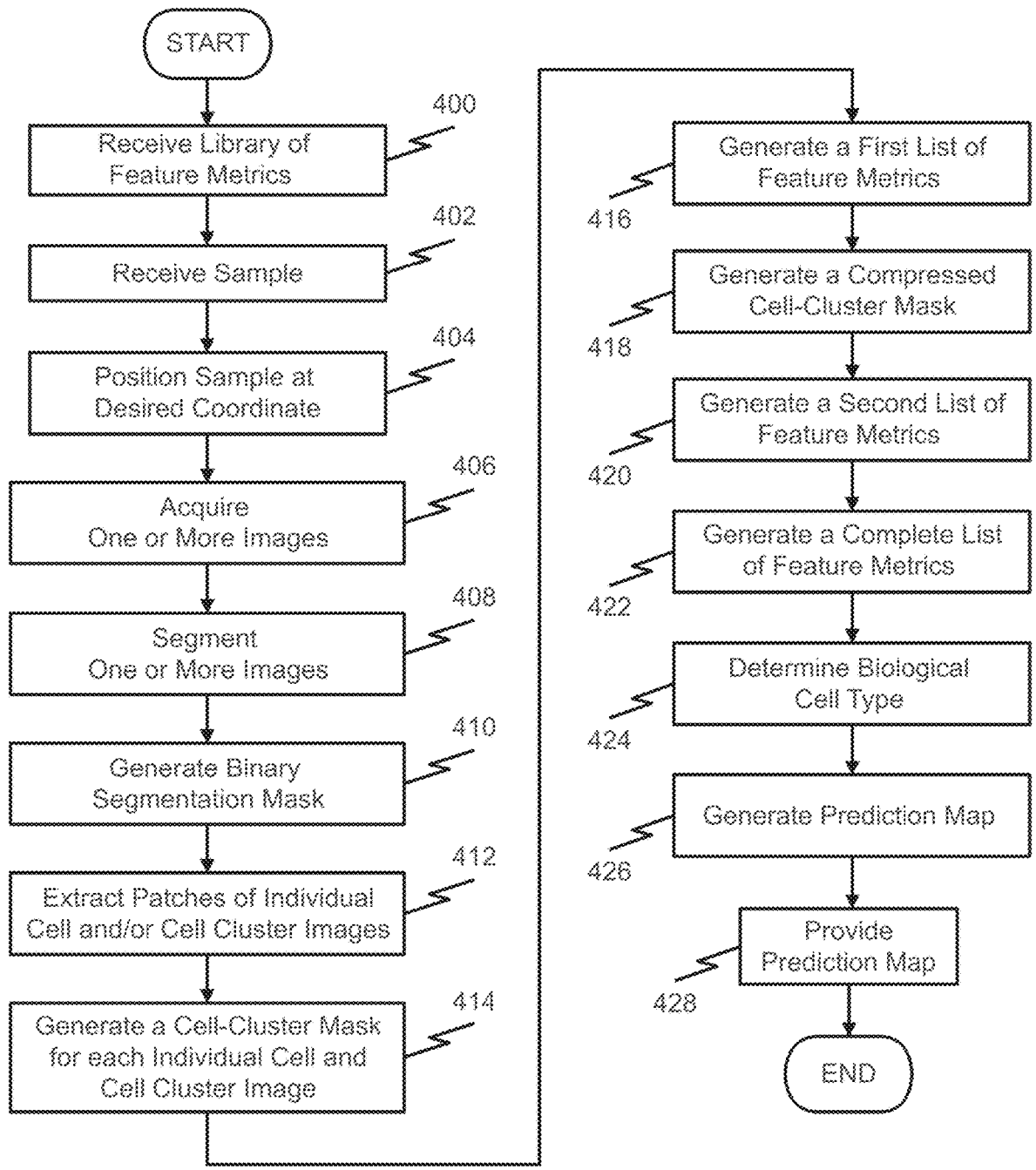
FIG. 4 is a flow diagram illustrating an embodiment of a process for determining a biological cell type.

FIG. 4 is a flow diagram illustrating an embodiment of a process for determining a biological cell type. In some embodiments, the process of FIG. 4 is performed using a computer system (e.g., computer system 116 of FIG. 1). In the example shown, in 400, a library of feature metrics is received. For example, a library of feature metrics corresponding to known biological cell types is received. For example, a library comprising reference spectra, cell morphology information (e.g., size, shape, and structure), and specific features corresponding to parts of the cell (e.g., cilia, sub-cellular organelles, etc.) that correspond to known biological cell types are received by a computer system (e.g., a computer system controlling a hyperspectral imager used to determined one or more biological cell types).

In 402, a sample is received. For example, a microscope slide prepared with a liquid sample containing one or more biological cells is received. In 404, the sample is positioned at the desired coordinate. For example, the sample is positioned by adjusting a scanning stage holding the prepared microscope slide until one or more biological cells are observable in the field of view of a hyperspectral imaging microscope (e.g., as observable by a human user). In 406, one or more images are acquired. For example, one or more images representing signals associated with one or more wavelengths are acquired by an imaging sensor. In various embodiments, the imaging sensor comprises a complementary metal-oxide-semiconductor (CMOS) sensor, a charge-coupled device (CCD) sensor, another solid-state imaging area sensor, or any other type of appropriate imaging sensor. In various embodiments, the imaging sensor comprises one or more of: a monochrome detector, a Red-Green-Blue (RGB) detector, an RGB and infrared (IR) detector, a Bayer pattern color detector, a multiple band detector, or any other appropriate sensor.

In 408, one or more images are segmented. For example, images of biological cells are processed to detect and segment cell pixels from the image background before feeding them into a classification algorithm. In some embodiments, the one or more images have been transformed and calibrated. For example, a mathematical matrix transform is applied (e.g., via a reconstruction matrix) to the data in the frames of images such that a calibration is applied. For example, the matrix transform converts images for a specific mirror gap setting into wavelength intensities and a mathematical calibration is applied to match the images to the correct wavelengths. In some embodiments, the one or more images are transformed and calibrated to produce a set of images that represent in one image a transmitted energy amount at a specific wavelength or range of wavelengths. In some embodiments, the one or more images collectively represent transmitted energy amounts for each of a set of wavelengths or range of wavelengths for a sample; this provides a spectral transmission characterization of the sample. In some embodiments, image segmentation comprises delineation of pixels belonging to one or more biological cells in a spectral image. In some embodiments, delineation of the pixels comprises determining a foreground and a background.

In various embodiments, a calibrated hypercube of images is processed using a combination of one or more supervised machine learning clustering algorithms (e.g., principal component analysis, K-Means, spectral angle mapping that is first trained on sample hypercubes of known biological cell types, or any other appropriate algorithm).

Principal component analysis (PCA) is used to simplify complexity in high-dimensional data while retaining trends and patterns by transforming data into fewer dimensions to summarize features. K-Means is an iterative clustering algorithm used to classify data into a specified number of groups by beginning with an initial set of randomly determined cluster centers. Each pixel in the image is then assigned to the nearest cluster center by distance and each cluster center is then recomputed as the centroid of all pixels assigned to the cluster. This process repeats until a desired threshold is achieved. Spectral angle mapping (SAM) compares a given spectra to a known spectrum, treating both as vectors and calculating the "spectral angle" between them and grouping them with respect to a threshold based on that angle.

In some embodiments, the use of strictly unsupervised models prevents the need to manually determine semantic labels. For example, within the field of machine learning, there are two main types of tasks: supervised, and unsupervised. The main difference between the two types is that supervised learning is done using a ground truth, or in other words, there is prior knowledge of what the output values that the training samples should be associated with. Therefore, the goal of supervised learning is to learn a function that, given a sample of data and desired outputs, best approximates the relationship between input and output observable in the data. Unsupervised learning, on the other hand, does not have labeled outputs, so its goal is to infer the natural structure present within a set of data points. Semantic labeling, or semantic segmentation, involves assigning class labels to pixels. In broad terms, the task involves assigning at each pixel a label that is most consistent with local features at that pixel and with labels estimated at pixels in its context, based on consistency models learned from training data. Semantic labeling when done manually is laborious and requires a large amount of domain knowledge. Thus, the use of strictly unsupervised models prevents the need to manually determine semantic labels.

Semantic labeling can be contrasted against instance labeling. Instance labeling, or instance segmentation, is different from the semantic segmentation method. Semantic segmentation refers to the process of associating every pixel of an image with a class label such as a person, flower, car, and so on. It treats multiple objects of the same class as a single entity. On the contrary, instance segmentation treats multiple objects of the same class as distinct individual instances. For example, assume there is an input image of a street view comprising several people, cars, buildings, etc. If only group objects belonging to the same category are desired, say distinguishing all cars from all buildings, this is the task of semantic segmentation. Within each category, for example people, if it is desired to distinguish each individual person, that will be the task of instance segmentation. Further, if it is desired to have both category-wise as well as instance-wise division, it will be a panoptic segmentation task.

In some embodiments, traditional K-means clustering algorithms are sufficient for background vs. foreground detection. In some embodiments, segmentation performance can be further improved by scaling to a deep autoregressive segmentation model, that defines two clusters by separating on mutual information.

In 410, a binary segmentation mask is generated. For example, pixels representing biological cells that have been segmented from the image background are used to generate a binary segmentation mask. In computer graphics, when a given image is intended to be placed over a background, the transparent areas can be specified through a binary mask. This way, for each intended image there are actually two bitmaps: the actual image, in which the unused areas are given a pixel value with all bits set to 0s, and an additional mask, in which the correspondent image areas are given a pixel value of all bits set to 0s and the surrounding areas a value of all bits set to 1s.

In some embodiments, the original image is grayscale converted, then a threshold method applied, and finally the output is a binary image that bears a mask of gray and black. Thresholding is a type of image segmentation, where pixels of an image are changed to make the image easier to analyze. In thresholding, an image is converted from color or grayscale into a binary image, i.e., one that is simply black and white. Most frequently, thresholding is used as a way to select areas of interest of an image, while ignoring the parts we are not concerned with (e.g., separating foreground from background). In some embodiments, a cell image foreground and background are used to generate a binary segmentation mask. In some embodiments, cellular morphology and contours are used to generate the binary segmentation mask.

In 412, patches of individual cell and/or cell cluster images are extracted. For example, patches of individual cells and/or cell clusters are cropped out from the overall image background. In some embodiments, patch extraction comprises cropping the one or more images to generate one or more patch images comprising an individual biological cell image and/or a cluster of biological cells image. In some embodiments, morphology and active cellular contours are used to select clusters of contiguous pixels in a mask that forms a cluster of cells. This allows training of clustering or extraction algorithms on 'atomic' units of interest within the image, minimizing input size into multi-dimensional deep networks, and allowing for preprocessing and normalizing on a cell-to-cell basis, rather than the whole image. The process can be further refined to individual cells using watershed segmentation and erosion/dilation techniques.

In 414, a cell-cluster mask is generated for individual cell and cell cluster images. For example, a binary segmentation mask is generated for each cell and/or cell cluster. Using this mask, only the relevant pixels for that cell are selected, background pixels are zeroed, and the image is cropped down to a small patch that covers exactly the area of the target cell or cell cluster. In some embodiments, patch extraction generates a cell-cluster mask for each individual biological cell image and each cluster of biological cells image.

In 416, a first list of feature metrics is generated. For example, a first list of feature metrics is generated by extracting features of interest from each cell-cluster mask. For example, morphological features of interest (e.g., size, shape, and intensity distribution of illumination) are empirically determined and extracted from each cell patch in order to generate a first list of feature metrics for each cell patch (e.g., metrics deemed significant criteria for identification and the associated statistical thresholds for each that have been established as indicating significance). In some embodiments, features of interest are manually determined by a human user. In some embodiments, feature extraction comprises determining a first set of one or more morphological features of interest from the cell-cluster mask to generate a first list of feature metrics.

In 418, a compressed cell-cluster mask is generated. For example, hyperspectral bands are compressed in order to reduce image file size while maximizing information. In order to reduce training and prediction times, and avoid large memory requirements, hyperspectral bands are compressed into embedded features using Primary Component Analysis (PCA). This can be improved (albeit at significant memory and computation cost) by implementing a three-dimensional convolutional neural network (3D CNN) auto-encoder. An autoencoder is a type of artificial neural network used to learn efficient codings of unlabeled data (i.e., unsupervised learning). The encoding is validated and refined by attempting to regenerate the input from the encoding. The autoencoder learns a representation (i.e., encoding) for a set of data, typically for dimensionality reduction, by training the network to ignore insignificant data (i.e., 'noise'). Compressing down to three features allows for 2D classifications rather than 3D classifications thereby saving time and expense. In some embodiments, feature compression comprises spectrally compressing the cell-cluster mask to generate a compressed cell-cluster mask.

In 420, a second list of feature metrics is generated. For example, a second list of feature metrics is generated by extracting additional features of interest from each cell-cluster mask. In some embodiments, additional morphological cell features (e.g., latent cell features) are extracted through deep learning methods (i.e., 'deep feature extraction'). Additional features of interest can be extracted using deep supervised learning to generate morphological features that are difficult and expensive to manually encode, as well as latent features embedded in the data. For example, latent cell features comprise features, patterns, and differences that are not obvious or discernable by human interrogation but that the deep learning methods determine are significant. In some embodiments, deep feature extraction comprises determining a second set of one or more morphological features of interest from the compressed cell-cluster mask to generate a second list of feature metrics.

In various embodiments, deep feature extraction is achieved by flattening the compressed cell patches and feeding it pixel by pixel into a fully connected neural network (FCNN) or into a one-dimensional convolutional neural network (1D CNN). In some embodiments, for example when using 2D multichannel patches, a Feature Pyramidal Network (FPN) is used to convolve the input cell patch at multiple scales before flattening features, allowing for scale invariant inputs (e.g., cells of different sizes or images at different magnifications). In various embodiments, the FPN, or other appropriate neural network model, outputs a list of extracted features for each compressed cell patch input.

In 422, a complete list of feature metrics is generated. For example, a complete list of feature metrics is generated by 'fusing' (or combining) the first and second lists of feature metrics (i.e., 'feature fusion'). In some embodiments, feature fusion comprises appending the second list of feature metrics to the first list of feature metrics to generate a complete list of feature metrics.

In 424, a biological cell type is determined. For example, a biological cell type is determined by classifying features of one or more images of biological cells and/or cell clusters and comparing to known biological feature classifications and types. For example, features of the one or more images of biological cells and/or cell clusters comprise spectral and spatial characteristics associated with specific biological serotypes of interest. Such characteristics include, for example, spectral profiles, spectral signatures, the shape and size of the imaged biological cell, etc.

Feature classification uses a deep supervised learning model to classify the biological cell type. Patch features of cell images are passed to a residual neural network classification algorithm (e.g., a ResNet-based classification algorithm) and trained against biological cell classes to produce a class prediction model. In some embodiments, feature classification comprises determining the type of biological cell in the cell-cluster mask based at least in part on comparing the complete list of feature metrics to a library of feature metrics corresponding to known biological cell types. In some embodiments, determining the type utilizes biological cell shape and/or size information as determined from the cell-cluster mask. In some embodiments, the type of each of the one or more biological cells comprises one or more of the following: a eukaryote, a prokaryote, a pathogen, a bacterium, an archaeon, a fungus, a plant, an animal, a human, a protist, a slime mold, a protozoon, an algae, a yeast, a species, a sub-species, a serotype, a strain, or any other appropriate type of biological cell. For example, biological cell typing (e.g., bacterial classification) is used in food preparation facilities, pharmaceutical production, hospitals, outpatient clinics, ambulatory surgery centers, urgent care centers, birth centers, blood banks, clinics and medical offices, dialysis centers, nursing homes, hospice homes, rehabilitation centers, clinical laboratories, biotechnology laboratories, etc. For example, accurate identification of bacterial isolates is critical for environmental monitoring programs in such facilities and centers.

In some embodiments, class labels comprise characteristics of the input image (e.g., texture, shape, or color aspects) that are summarized by numerical vectors (i.e., feature vectors). In various embodiments, training the classification algorithm uses a diverse assortment of patches from many different images (e.g., patches of individual biological cells or biological cell clusters). For example, depending on the desired level of accuracy for correctly identifying various biological cell types, the diverse assortment of patches comprises 50, 500, 5000, or any other appropriate number of patches required to achieve the desired level of accuracy. For example, training on 50 patches may correctly identify 75-80% of the cell patches, training on 500 patches may correctly identify 98% of the cell patches, and training on 5000 patches may correctly identify 99% or more of the cell patches. The use of a ResNet classification algorithm allows application of deep 1D CNNs without the risk of exploding gradients and overfitting on inherent noise. The ResNet classification algorithm outputs a list of probabilities scoring the likelihood that each input patch belongs to each class.

In some embodiments, the maximum probabilities generated by the classification algorithm are used to classify each patch (e.g., by assigning a class label to each patch). In some embodiments, classification is achieved using an FCNN. In various embodiments, biological cell classification utilizes a hybrid deep-learning framework, a long-short term memory (LSTM) network, a deep residual network (e.g., one of the family of ResNet algorithm such as ResNet50, ResNet50 with Keras, ResNet-101, ResNet-152, etc.), and/or a 1D-CNN.

In some embodiments, one or more neural network models are used to detect, identify, and/or classify images of biological cells (e.g., potential pathogens)—for example, a convolutional neural network (CNN), a region-based convolutional neural network (R-CNN), a Fast R-CNN model, a Faster R-CNN model, a You Only Look Once (YOLO) model from the family of YOLO models, or any other appropriate neural network model.

In various embodiments, a bounding box model is used to localize and/or detect images of biological cells. In various embodiments, the bounding box model comprises one or more of a Tensor Flow model (e.g., a Tensor Flow application programming interface (API), a convolutional neural network, a region-based convolutional neural network (R-CNN), a Fast R-CNN model, a Faster R-CNN model, a You Only Look Once (YOLO) model from the family of YOLO models, an EdgeBoxes model, or any other appropriate bounding box model.

In some embodiments, the bounding box model is trained using the intersection over union (IoU) method (i.e., the intersection of the computed bounding box with the bounding box for ground truth), with the IoU value set to an appropriate value corresponding to true positives, false positives, and false negatives (e.g., the IoU value is set to 0.5, 0.75, 0.9, 0.95, or any appropriate value).

In some embodiments, precision and recall values are calculated and plotted (e.g., as 'PR graphs) to evaluate the performance of the bounding box model (e.g., calculated from the number of true positives (TP), false positives (FP), and false negatives (FN) achieved while training the bounding box model). In some embodiments, precision and recall are calculated using the formulas Precision=TP/(TP+FP) and Recall=TP/(TP+FN). In some embodiments, the performance of the bounding box model is evaluated using the mean average precision (mAP) value (e.g., using a multi-point interpolated average precision). In some embodiments, the point of operation for the performance of the bounding box model on the generated PR graphs is determined empirically from test data used during training the system (e.g., the bounding box model is set to operate at greater than 50%, 60%, 68%, 72%, 80%, or any other appropriate level of recall). In some embodiments, the point of operation for bounding box model on the generated PR graphs is adjusted after further model training and/or evaluation under operational conditions (e.g., to change the number of generated bounding boxes that require further evaluation).

In some embodiments, one or more neural network models are used to classify images of biological cells. The neural network model used to classify images of biological cells (i.e., 'the classifier model') assigns a class label to the one or more biological cells outlined by a bounding box. In some embodiments, the classifier model uses sharp edge detection. In some embodiments, the classifier model uses machine vision. In some embodiments, the classifier model uses machine learning approaches. For example, the classifier model uses one or more neural network models to classify biological cells that have been detected by the bounding box model. In various embodiments, the one or more neural network models used by the classifier model are the same, different, or a combination of same or different models as used by the bounding box model.

In 426, a prediction map is generated. For example, generating (or 'reconstructing') a prediction map measures where each patch is located within an image (e.g., using x,y coordinates). A reconstructed prediction map is used when predicting (i.e., classifying) patches within new images. In some embodiments, when predicting segmented cells on new images, each patch is tracked as to where it comes from in a target image, and then used to reconstruct a prediction mask from each classified patch. In some embodiments, individual cell classifications are compiled for each image to generate a reconstructed segmentation map. In some embodiments, the prediction map reconstruction comprises associating the type of biological cell in the cell-cluster mask with its location within the one or more images of one or more biological cells. In some embodiments, the prediction map reconstruction is used to improve confidence in the type of biological cell determined from the cell-cluster mask by comparing to one or more cell-cluster masks of the individual biological cell image and/or the cluster of biological cells image.

In 428, the prediction map is provided, and the process ends. For example, the prediction map is provided to computer memory for storage or is delivered to an application for further processing. In various embodiments, the prediction map is used when training a classification algorithm (e.g., to improve accuracy when analyzing images of similar cells) or when determining a biological cell type from a series of images (e.g., to decrease the time required to determine a particular cell type). In various embodiments, the prediction map is stored in computer memory, and/or saved in a data storage unit (e.g., a data storage unit of the computer system controlling the hyperspectral imaging system). In various embodiments, the prediction map is saved as an image file—for example, a 2D image (e.g., a false color image) that shows which cells in the overall image have been classified and their type. In various embodiments, the provided class label for an identified biological cell within the prediction map includes related metadata (e.g., time and date, a level of confidence, the number and/or density of the identified biological cells, a plot or graph of the associated hyperspectral data, etc.). In some embodiments, a composite image is generated with markers or flags indicating the presence of the one or more identified biological cells. In various embodiments, the prediction map is displayed to a system user as a hyperspectral image (e.g., displayed on a monitor of the controlling computer system) and/or provided to a software application that allows the user to interact with the hyperspectral image. For example, a software application that allows the user to click on a specific pixel, or a specific cell or cell cluster, so as to observe the spectral profile of the chosen region, or to click on an identified biological cell class label so as to observe any related metadata.

Figure 5:
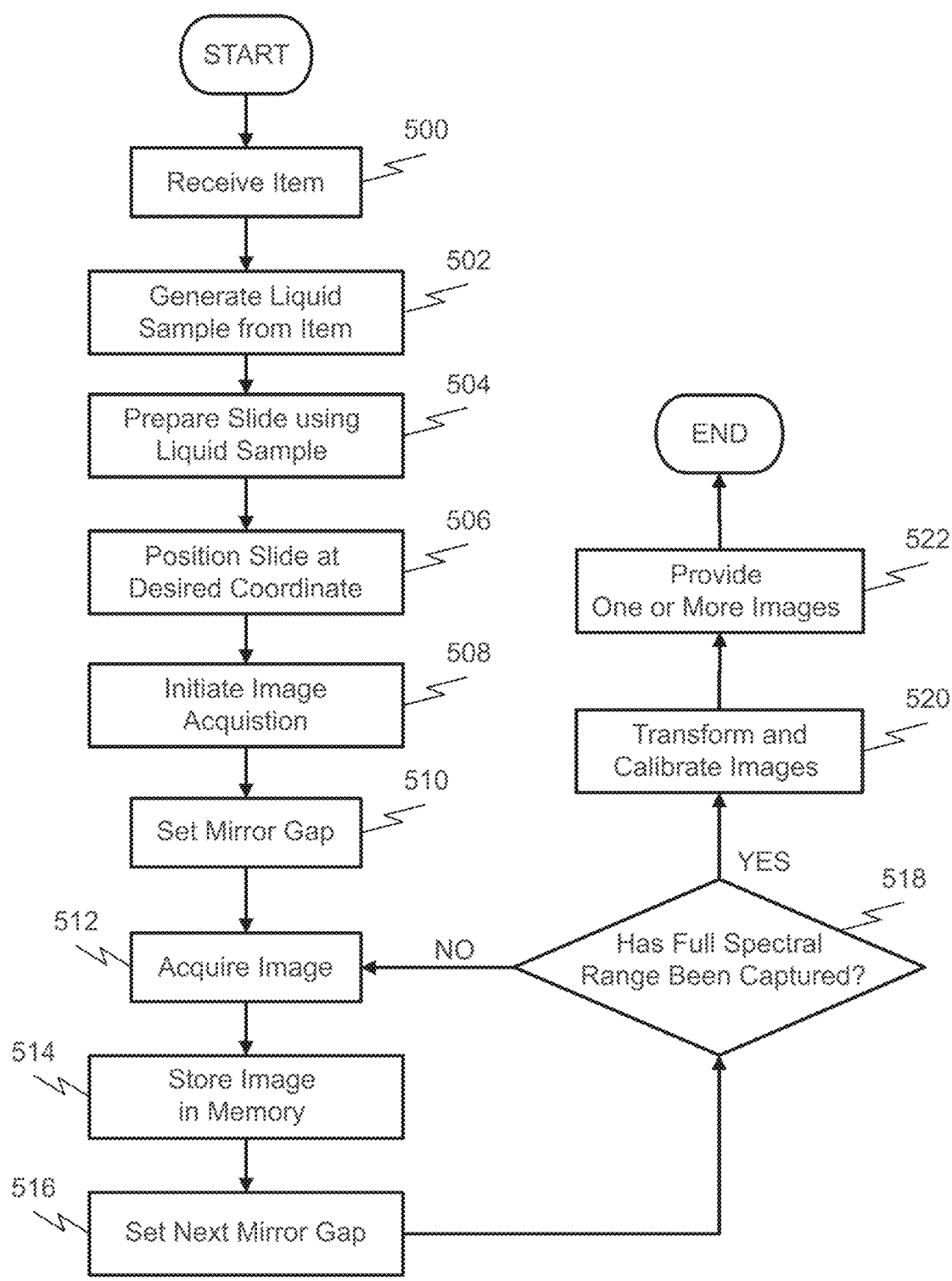
FIG. 5 is a flow diagram illustrating an embodiment of a process for providing one or more images.

FIG. 5 is a flow diagram illustrating an embodiment of a process for providing one or more images. In some embodiments, the process of FIG. 5 is performed using a computer system (e.g., computer system 116 of FIG. 1). In the example shown, in 500, an item is received. For example, a food item is received to test for the presence of a foodborne pathogen. In some embodiments, an item comprises a surface (e.g., a surface such as plastic, stainless steel, glass, wood, etc.). In 502, a liquid sample is generated from an item. For example, wash and/or rinse water used to wash and/or rinse the item is collected. For example, the surface of the item is swabbed (e.g., using a cotton or polyester swab, a sterile sponge or fabric, etc.) and the swab is placed in a liquid (e.g., a growth medium) to transfer any potential foodborne pathogens or surface bacteria from the item to the liquid.

In 504, a slide is prepared using the liquid sample. For example, the liquid sample is agitated (e.g., to ensure any potential pathogens are dispersed uniformly through the liquid prior to preparing the slide), and a few drops (e.g., 2, 3, 4, 5 or any other appropriate number of drops) of the liquid sample are transferred to a microscope slide. In some embodiments, a cover slip (e.g., a glass or plastic cover slip) is placed over the few drops of liquid. In some embodiments, the liquid sample does not require any special preparation (e.g., such as staining or transfection). In some embodiments, cells in the sample are stained (e.g., to provide additional contrast, to selectively stain sub-cellular organelles, to selectively stain specific types of cells more than other cell types, etc.). In various embodiments, stains comprise fluorescent and non-fluorescent dyes, fluorescent ion indicators, ionophores, fluorescent ligands that target G protein coupled receptors (GPCRs), or any other appropriate type of stain, dye, or other contrast agent.

In 506, the slide is positioned at a desired coordinate. For example, the microscope slide comprising a few drops of liquid sample is positioned into the field of view of a hyperspectral imaging microscope. In 508, image acquisition is initiated. For example, image acquisition is initiated by a system user via a user interface to the computer system that controls a hyperspectral imaging microscope.

In 510, a mirror gap is set. For example, the computer system that controls a hyperspectral imaging microscope sets a mirror gap spacing of the tunable Fabry-Perot etalon within the hyperspectral imaging microscope. In 512, an image is acquired. For example, the computer system that controls a hyperspectral imaging microscope instructs a light source within the hyperspectral imaging microscope to turn on (e.g., to turn on at a particular light intensity and/or set of wavelengths) and instructs an imaging sensor within the hyperspectral imaging microscope to acquire an image of the liquid sample on the microscope slide.

In 514, the image is stored in memory. For example, a digital image of the liquid sample on the microscope slide is stored in the memory of the computer system that controls a hyperspectral imaging microscope. In some embodiments, the computer system stores information regarding the acquisition of the image (e.g., the date, the gap setting, the illumination setting, a comment field, a sample identifier, an associated calibration image, a session identifier, etc.). In 516, a next mirror gap is set. For example, the computer system that controls a hyperspectral imaging microscope sets a next mirror gap spacing of the tunable Fabry-Perot etalon within the hyperspectral imaging microscope.

In 518, it is determined whether a full spectral range has been captured. For example, a computer program in the computer system that controls a hyperspectral imaging microscope determines whether images of the liquid sample on the microscope slide have been obtained for all desired mirror gap settings. For example, the desired mirror gap settings corresponding to specific band passes of a tunable Fabry-Perot etalon are determined by the system user at the time of image acquisition, or pre-determined, for example, within a user settings file of the computer program or pre-determined based on a selected pathogen type of interest.

In 520, the images are transformed and calibrated. For example, a mathematical matrix transform is applied (e.g., via a reconstruction matrix) to the data in the frames of images such that a calibration is applied. For example, the matrix transform converts images of the liquid sample on the microscope slide for the desired mirror gap settings into wavelength intensities and a mathematical calibration is applied to match the images to the correct wavelength indices.

For example, a system calibration is performed, and the matrix transform is determined prior to imaging samples. To perform the calibration, the system user (e.g., using a calibration program running on the computer system controlling the hyperspectral imager) sets the mirror gap range over which a known target spectrum is acquired. A calibration controller program sets the settable illumination source to one of a set of illumination structure types (e.g., a narrow band illumination defined by its peak frequency) and to one of a set of settable gaps of the tunable Fabry-Perot etalon. For each gap and illumination type, the controller program stores the measured illumination spectrum and an image from the imaging sensor in a calibration scan memory. Once all sets of illumination types and etalon gaps have been acquired in the calibration scan memory, the controller sends a calibration signal to the calibration processor to process the calibration scan data. The calibration processor calculates the reconstruction matrix using a linear model with regularization (e.g. $L_1$, $L_2$, or $L_0$ regularization) and stores the resulting reconstruction matrix (e.g., in a reconstruction matrix memory).

For example, the parameters specifying the type of illumination source are provided by a signal L. Light from the illumination source is scattered by a known target with spectrum $S^*(\lambda)$ and passes through the tunable Fabry-Perot etalon with a settable gap specified by a signal $\delta$. Light coming out of the tunable Fabry-Perot etalon is detected by the imaging sensor of the hyperspectral imager. A calibration reader controller receives image data I[x,y,c] from imaging sensor for each setting of the tunable Fabry-Perot etalon gap $\delta$ and light source L and stores the image data I[x,y,c] for each gap setting $\delta$ in data scan memory. For example, the image data I contains c pixel types (e.g. red, green, blue) at locations x,y. After a complete set of data has been acquired for each gap setting $\delta$, the reader controller sends a READ signal to a spectrum calculator instructing it to calculate the target spectrum estimate $S[\lambda]$. A spectrum calculator program reads in the data from the calibration scan memory as matrix $G[\delta,I]$ and reads in a reconstruction matrix $R[\delta,\lambda]$ from reconstruction matrix memory. The spectrum calculator then multiplies matrix $G[\delta,I]$ by matrix $R[\delta,\lambda]$ to obtain the target spectrum estimate $S[\lambda]$. In some embodiments, where there are multiple pixel values (x,y) processed by spectrum calculator, the spectral estimate $S[\lambda]$ will be a three-dimensional $S[x,y,\lambda]$ hyper-spectral measurement.

In some embodiments, the reconstruction matrix memory contains reduced descriptions of the reconstruction matrix for faster spectral estimation and better noise immunity. For example, the reconstruction matrix is estimated using a small number of principle components. This estimated reconstruction matrix comprises a reduced reconstruction matrix (e.g., determined using the reduced description of the reconstruction matrix) that is used in place of the reconstruction matrix.

In various embodiments, image transformation and/or calibration is performed after step 512 (i.e., image acquisition), after step 514 (i.e., storing image in memory), or after step 516 (i.e., setting the next mirror gap).

In 522, one or more images are provided, and the process ends. For example, one or more images are provided to computer memory and/or to an application for further processing. In various embodiments, the one or more images are stored in computer memory, and/or saved in a data storage unit (e.g., a data storage unit of the computer system controlling the hyperspectral imaging system). In various embodiments, the one or more images are saved as an image file—for example, a tiff file, a png file, a jpg file, or any other appropriate image file format. In various embodiments, the one or more images are provided to a system user (e.g., displayed on a monitor of the controlling computer system) and/or provided to a software application that allows the user to interact with the one or more images.

Figure 6:
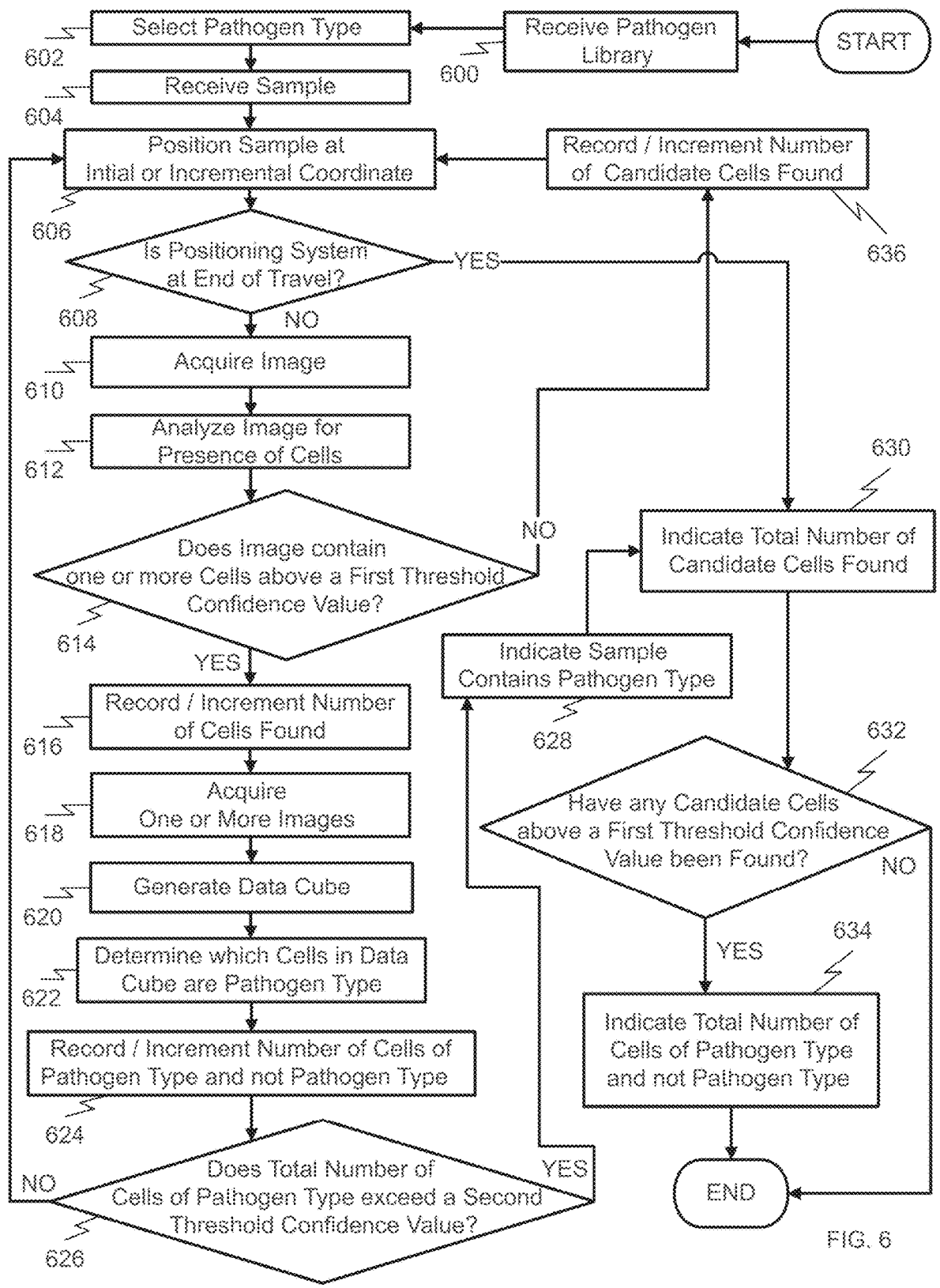
FIG. 6 is a flow diagram illustrating an embodiment of a process for automatically determining a type of pathogenic cell.

FIG. 6 is a flow diagram illustrating an embodiment of a process for automatically determining a type of pathogenic cell. In some embodiments, the process of FIG. 6 is performed using a computer system (e.g., computer system 116 of FIG. 1). In the example shown, in 600, a pathogen library is received. For example, a library of hyperspectral data corresponding to known pathogenic cells is received. For example, a library comprising reference spectra, cell morphology information (e.g., size, shape, and structure), and specific features corresponding to parts of the cell (e.g., cilia, sub-cellular organelles, etc.) that correspond to known pathogenic cell types are received by a computer system (e.g., a computer system controlling a hyperspectral imager used to determined one or more pathogenic cell types).

In 602, a pathogen type is selected. For example, Escherichia coli (E. coli) is a pathogen type selected. For example, E. coli O157:H7 is the pathogenic serotype of E. coli that is selected. The traditional method for identifying E. coli uses antibodies to test for surface antigens: the O-polysaccharide antigens, flagellar H-antigens, and capsular K-antigens. There are currently approximately 186 different E. coli O-groups and 53 H-types. E. coli O157:H7 causes a severe intestinal infection in humans. It is the most common strain to cause illness in people.

In 604, a sample is received. For example, a microscope slide with a liquid sample prepared from a food item is received and placed into a mounting fixture on a hyperspectral imaging microscope. In 606, the sample is positioned at an initial or incremental coordinate. For example, the sample is positioned at an initial coordinate by adjusting a scanning stage holding the prepared microscope slide until one or more suspect cells are observable in the field of view of a hyperspectral imaging microscope (e.g., as observable by a human user). For example, the sample is positioned at an incremental coordinate by a computer program instructing a scanning stage to scan an area starting at the initial coordinate (e.g., a 2×2 mm area, a 2.5×2×2.5 mm area, a 2×3 mm area, a 3×3 mm area, or any other appropriate scanning area).

In 608, it is determined whether a positioning system is at the end of its travel. For example, it is determined by a computer program (e.g., a computer program running on the computer system that is controlling the hyperspectral imaging system) that an x,y scanning positioning system (e.g., a piezo-actuated stage, a linear motor direct-drive stage, etc.) is at the end of its travel by receiving a stage position location from one or more stage positioning encoders that corresponds to the final x,y coordinate, indicating that the stage has reached its end of desired travel. In response to determining that the positioning system is at the end of its travel, the process flows to 630. In response to determining that positioning system is not at the end of its travel, the process flows to 610.

In 610, an image is acquired. For example, one or more digital images of an illuminated sample area are acquired by an imaging sensor within a dark-field hyperspectral microscope imaging system. In 612, the image is analyzed for the presence of cells. For example, a semantic cell segmentation program localizes cell boundaries in an image and distinguishes these cell boundaries from the background of the image producing a pixel-wise binary mask. Using the mask, the cell 'patch' is cropped, or 'extracted' from the image background for comparison to a collection of known cell morphologies within the pathogen library. In various embodiments, classical imaging techniques for cell segmentation are used to detect cell boundaries (e.g., watershed transformation, morphological image processing, Laplacian of Gaussian (LoG) filters, pixel cell classification, etc.). In various embodiments, artificial intelligence (AI) imaging techniques are used for cell segmentation (e.g., U-Net, Mask R-CNN, etc.).

In 614, it is determined whether the image contains one or more cells above a first threshold confidence value. For example, it is determined whether any extracted cell patches from the image match a known cell morphology in the pathogen library above a first threshold confidence value (e.g., above a 70% first threshold confidence value, above a 75% first threshold confidence value, above an 80% first threshold confidence value, above a 90% first threshold confidence value, above a 95% first threshold confidence value, above a 98% first threshold confidence value, or any other appropriate first threshold confidence value). In response to determining that the image does not contains one or more cells above a first threshold confidence value, the process flows to 636. In 636, a number of candidate cells found is recorded/incremented, and the process flows to 606. In response to determining that the image contains one or more cells above a first threshold confidence value, the process flows to 616.

In 616, the number of cells found is recorded/incremented. For example, five cell patches from the image that match a known cell morphology with a confidence value above a first threshold confidence value are found and the number five is recorded in computer memory. For example, five cell patches from the image that match a known cell morphology with a confidence value above a first threshold confidence value are found and the number five is incremented in computer memory to an existing list of cells found.

In 618, one or more images are acquired. For example, one or more images representing signals associated with one or more wavelengths are acquired by an imaging sensor within a hyperspectral microscope imaging system. In 620, a data cube is generated. For example, multiple images are combined to generate a three-dimensional data structure, or 'cube'), that contains two spatial dimensions (x,y) and one spectral dimension (k). Consequently, each pixel located in the x,y spatial domain contains a spectrum which reflects the characteristics of that portion of the object that has been imaged.

In 622, it is determined which cells in the data cube are a pathogen type. For example, it is determined which cells in the data cube are of type E. coli O157:H7. For example, the type of cells in the data cube are determined by classifying features of the cells (and/or cell clusters) and comparing to known pathogenic feature classifications and types within the pathogen library. For example, features of the one or more images of pathogenic cells and/or cell clusters comprise spectral and spatial characteristics associated with specific pathogenic serotypes of interest. Such characteristics include, for example, spectral profiles, spectral signatures, the shape and size of the imaged pathogenic cell, etc. In some embodiments, determining which cells in the data cube are a pathogen type comprise matching feature metrics of the unknown samples to known pathogenic feature classifications and/or types within the pathogen library. In some embodiments, determining which cells in the data cube are a pathogen type comprise matching feature metrics of the unknown samples to known pathogenic feature classifications and/or types within the pathogen library above a threshold level of confidence (e.g., above a 70% threshold level of confidence, above a 75% threshold level of confidence, above an 80% threshold level of confidence, above a 90% threshold level of confidence, above a 95% threshold level of confidence, above a 98% threshold level of confidence, or any other appropriate threshold level of confidence).

Feature classification uses a deep supervised learning model to classify the pathogenic cell type. Patch features of cell images are passed to a residual neural network classification algorithm (e.g., a ResNet-based classification algorithm) and trained against pathogenic cell classes to produce a class prediction model. In some embodiments, feature classification comprises determining the type of pathogenic cell in the cell mask based at least in part on comparing the complete list of feature metrics to a library of feature metrics corresponding to known pathogenic cell types. In some embodiments, determining the type utilizes cell shape and/or size information as determined from the cell mask.

In some embodiments, class labels comprise characteristics of the input image (e.g., texture, shape, or color aspects) that are summarized by numerical vectors (i.e., feature vectors). In various embodiments, training the classification algorithm uses a diverse assortment of patches from many different images (e.g., patches of individual cells or cell clusters). For example, depending on the desired level of accuracy for correctly identifying various biological cell types, the diverse assortment of patches comprises 50, 500, 5000, or any other appropriate number of patches required to achieve the desired level of accuracy. For example, training on 50 patches may correctly identify 75-80% of the cell patches, training on 500 patches may correctly identify 98% of the cell patches, and training on 5000 patches may correctly identify 99% or more of the cell patches. The use of a ResNet classification algorithm allows application of deep 1D CNNs without the risk of exploding gradients and overfitting on inherent noise. The ResNet classification algorithm outputs a list of probabilities scoring the likelihood that each input patch belongs to each class.

In some embodiments, the maximum probabilities generated by the classification algorithm are used to classify each cell patch (e.g., by assigning a class label to each cell patch). In some embodiments, classification is achieved using an FCNN. In various embodiments, pathogenic cell classification utilizes a hybrid deep-learning framework, a long-short term memory (LSTM) network, a deep residual network (e.g., one of the family of ResNet algorithm such as ResNet50, ResNet50 with Keras, ResNet-101, ResNet-152, etc.), and/or a 1D-CNN.

In some embodiments, one or more neural network models are used to detect, identify, and/or classify images of pathogenic cells—for example, a convolutional neural network (CNN), a region-based convolutional neural network (R-CNN), a Fast R-CNN model, a Faster R-CNN model, a You Only Look Once (YOLO) model from the family of YOLO models, or any other appropriate neural network model.

In various embodiments, a bounding box model is used to localize and/or detect images of pathogenic cells. In various embodiments, the bounding box model comprises one or more of a Tensor Flow model (e.g., a Tensor Flow application programming interface (API), a convolutional neural network, a region-based convolutional neural network (R-CNN), a Fast R-CNN model, a Faster R-CNN model, a You Only Look Once (YOLO) model from the family of YOLO models, an EdgeBoxes model, or any other appropriate bounding box model.

In some embodiments, the bounding box model is trained using the intersection over union (IoU) method (i.e., the intersection of the computed bounding box with the bounding box for ground truth), with the IoU value set to an appropriate value corresponding to true positives, false positives, and false negatives (e.g., the IoU value is set to 0.5, 0.75, 0.9, 0.95, or any appropriate value).

In some embodiments, precision and recall values are calculated and plotted (e.g., as 'PR graphs) to evaluate the performance of the bounding box model (e.g., calculated from the number of true positives (TP), false positives (FP), and false negatives (FN) achieved while training the bounding box model). In some embodiments, precision and recall are calculated using the formulas Precision=TP/(TP+FP) and Recall=TP/(TP+FN). In some embodiments, the performance of the bounding box model is evaluated using the mean average precision (mAP) value (e.g., using a multi-point interpolated average precision). In some embodiments, the point of operation for the performance of the bounding box model on the generated PR graphs is determined empirically from test data used during training the system (e.g., the bounding box model is set to operate at greater than 50%, 60%, 68%, 72%, 80%, or any other appropriate level of recall). In some embodiments, the point of operation for bounding box model on the generated PR graphs is adjusted after further model training and/or evaluation under operational conditions (e.g., to change the number of generated bounding boxes that require further evaluation).

In some embodiments, one or more neural network models are used to classify images of pathogenic cells. The neural network model used to classify images of pathogenic cell (i.e., 'the classifier model') assigns a class label to the one or more biological cells outlined by a bounding box. In some embodiments, the classifier model uses sharp edge detection. In some embodiments, the classifier model uses machine vision. In some embodiments, the classifier model uses machine learning approaches. For example, the classifier model uses one or more neural network models to classify pathogenic cells that have been detected by the bounding box model. In various embodiments, the one or more neural network models used by the classifier model are the same, different, or a combination of same or different models as used by the bounding box model.

In 624, the number of cells of a pathogen type and not of a pathogen type is recorded/incremented. For example, forty-eight (48) cell patches from the image that match *E. coli* O157:H7 feature metrics in the pathogen library are found and sixty-five (65) cell patches from the image that do not match *E. coli* O157:H7 feature metrics are found. In this example, the number forty-eight (48) is recorded in computer memory (e.g., by first creating a list to contain the number of *E. coli* O157:H7 cells found), or the number forty-eight (48) is incremented to an existing list of *E. coli* O157:H7 cells found. Further, the number sixty-five (65)) is recorded in computer memory (e.g., by first creating a list to contain the number of cells that do match *E. coli* O157:H7), or the number sixty-five (65) is incremented to an existing list of the number of cells that do match *E. coli* O157:H7.

In 626, it is determined whether the total number of cells of a pathogen type exceed a second threshold confidence value. For example, it is determined that forty-eight (48) cell patches from the image match both the *E. coli* O157:H7 reference spectra and the *E. coli* O157:H7 morphological information in the pathogen spectral library above a second threshold confidence value (e.g., above a 70% second threshold confidence value, above a 75% second threshold confidence value, above an 80% second threshold confidence value, above a 90% second threshold confidence value, above a 95% second threshold confidence value, above a 98% second threshold confidence value, or any other appropriate second threshold confidence value). In some embodiments, exceeding a second threshold confidence value comprises determining that the total number of cells of a pathogen type also match both the spectral and spatial morphological information within the pathogen library. In some embodiments, exceeding a second threshold confidence value comprises determining that the total number of cells of a pathogen type match either the spectral or spatial morphological information within the pathogen library. In some embodiments, exceeding a second threshold confidence value comprises determining that the total number of cells of a pathogen type match a minimum number of spectral and spatial morphological information within the pathogen library, or match any appropriate combination or number of spectral and spatial morphological information. In some embodiments, exceeding a second threshold confidence value comprises determining that the total number of cells of a pathogen type exceeds a minimum number (e.g., 2, 3, 5, 10, 50, etc.). In some embodiments, exceeding a second threshold confidence value comprises determining that the total number of cells of a pathogen type exceeds a minimum percentage of total cells found (e.g., 0.1%, 0.5%, 1%, 2.4%, 3.2%, etc.), or any other appropriate method of determining a second threshold confidence value.

In response to determining that the total number of cells of a pathogen type does not exceed a second threshold confidence value, the process flows to 606. In response to determining that the total number of cells of a pathogen type exceeds a second threshold confidence value, the process flows to 628.

In 628, it is indicated that the sample contains a pathogen type. For example, the sample includes a number of cells of a pathogen type exceeding a second threshold confidence level, so the sample is deemed to contain the pathogen type.

In 630, the total number of candidate cells found is indicated. For example, at the end of travel or positions available to the system from 608, or after an indication that the sample contains a pathogen type from 628, a total number of candidate cells found is indicated, where the candidate cells are potential cells that did not exceed a first threshold confidence value.

In 632, it is determined whether any candidate cells above a first threshold confidence value have been found. For example, it is determined whether any cells have been found. In response to determining that candidate cells above a first threshold confidence value have been found, in 634 a total number of cells of pathogen type and not pathogen type is indicated, and the process ends. In response to determining that no candidate cells above a first threshold confidence value have been found, the process ends.

In some embodiments, the process of FIG. 6 illustrates a method for rapidly locating and identifying individual cells comprising (i) a determination of whether there are sufficient cells found with the pathogen of interest to state that the sample is contaminated (e.g., at some threshold confidence level), (ii) a determination of insufficient cells found, either with or without the pathogen of interest, to state that the sample is contaminated (i.e., inconclusive), or (iii) a determination that sufficient cells were found without the pathogen of interest to state that the sample is not contaminated (e.g., at some threshold confidence level).

In some embodiments, the process of FIG. 6 illustrates a method for determination of whether there are cells in the field of view (FOV) (e.g., in a sparsely populated FOV) prior to capturing spectral data-cubes. In some embodiments, a parallel imaging system is utilized—for example, utilizing optics that provide a large field of view (e.g., using a mesolens). In various embodiments, identification algorithms used to determine whether there are cells in the FOV include non-spectral identification techniques based on geometric and/or object shape information—for example, traditional machine vision algorithms utilizing edge detection or similarly trained machine learning and artificial intelligence algorithms (e.g., convolutional neural networks).

In some embodiments, the process of FIG. 6 illustrates a method for automatically searching for cells (e.g., in the case of low cell concentrations), wherein the targeting algorithm is combined in various embodiments with large FOV collection optics or high NA objectives. In some embodiments, the system is controlled by the user through a computer interface (i.e., the UI—User Interface). In various embodiments, the UI provides a means to (i) specify which pathogen(s) are to be identified, (ii) which pathogen(s) are to be reported, and/or (iii) initiate the process of automatically searching for and identifying pathogens. For example:

1. Input pathogen(s) of interest into UI
2. Manually extract, load, and position sample
3. Set a threshold within the UI
4. Report results via the UI (e.g., the number of candidate targets found, the number of candidate targets above a threshold confidence level found, the number of targets above a selected confidence level that contain the pathogen of interest, the number of targets not containing the pathogen of interest, a pass/fail output for each pathogen of interest, etc.).

In various embodiments, one or more of the items in step 2 (i.e., sample extraction, loading, and positioning) are automated. For example, an automated sample-slide loading and unloading or handling system is integrated into the system to facilitate and expedite the automated analysis of large sets of samples. In various embodiments, digital pathology tools, and/or microfluidics (e.g., as used in flow cytometry), are used to simplify sample collection and loading and to obviate issues associated with immersion lenses, increase the inspection rate, and achieve continuous operation. In some embodiments, the UI will provide an option to allow the user to train the algorithm for a pathogen of interest through a guided process (e.g., an application wizard).

Figure 7A:
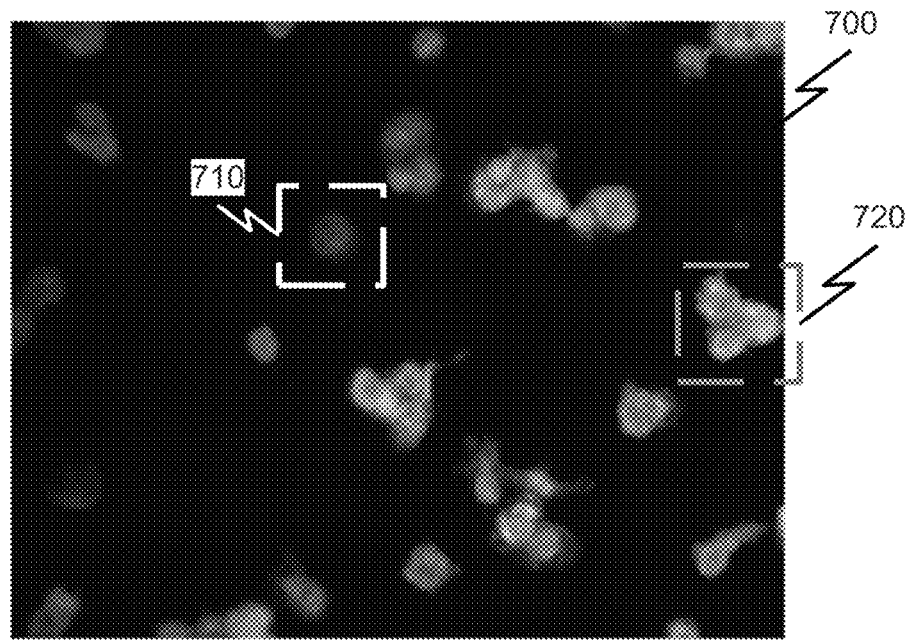
FIG. 7A is an image illustrating an example of biological cells and cell clusters using an embodiment of a Fabry-Perot tunable etalon interferometer.

FIG. 7A is an image illustrating an example of biological cells and cell clusters using an embodiment of a Fabry-Perot tunable etalon interferometer. In the example shown, image 700 is a fluorescence microscope image of morphologically complex eukaryotic cells (i.e., a fluorescence image of the cytoplasm of THP-1 cells, a human leukemia monocytic cell line). Cell 710 is a single THP-1 cell. Cell cluster 720 is a cell cluster of three THP-1 cells. In some embodiments, image 700 is obtained using hyperspectral imaging microscope 300 and computer system 316 of FIG. 3.

Figure 7B:
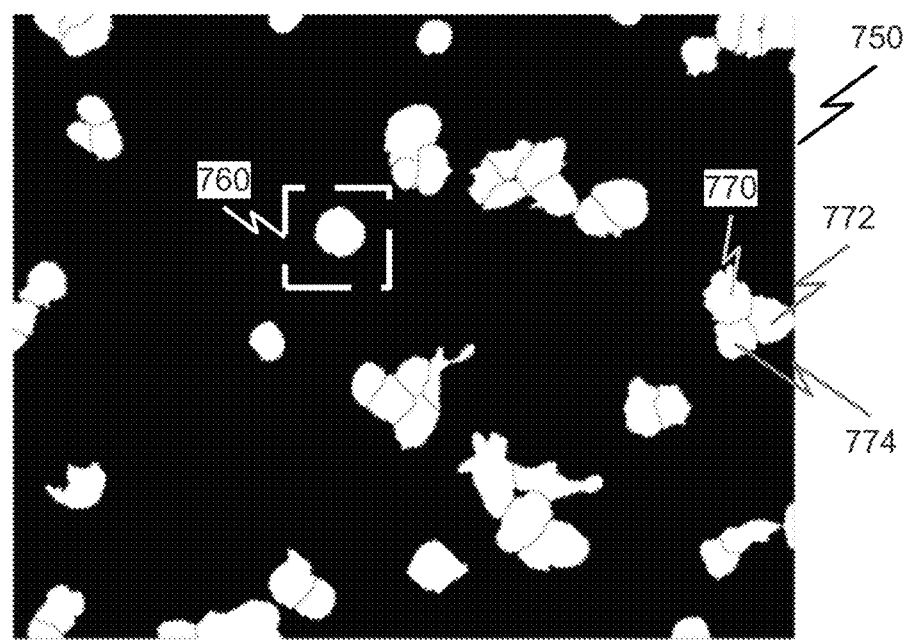
FIG. 7B is a diagram illustrating an embodiment of semantic and instance segmentation in an image of biological cells and cell clusters.

FIG. 7B is a diagram illustrating an embodiment of semantic and instance segmentation in an image of biological cells and cell clusters. In the example shown, image 750 is the fluorescence microscope image of morphologically complex eukaryotic cells of FIG. 7A after ground truth segmentation. Ground truths are "true and accurate" segmentations that are typically made by one or more human experts. FIGS. 7A and 7B illustrate the concept of semantic and instance cell segmentation in an image of biological cells. Cell 710 of FIG. 7A is shown in FIG. 7B semantically segmented from image 750 as segmented cell 760 (i.e., segmented cell 760 can be considered foreground against the dark-field image's black background). Cell cluster 720 from FIG. 7A is shown instance segmented into three distinct cell patches (or three different 'instances' of cells): cell patch 770, cell patch 772, and cell patch 774. Cell segmentation algorithms can be categorized into semantic segmentation and instance segmentation. Semantic segmentation refers to the partitioning of images into different semantic parts and assigning each pixel to a class (e.g., cell foreground or background). Instance segmentation seeks to identify each instance of the same class, by separately detecting and delineating every single cell shown in the image. In the example shown, segmented cell 760 can thus be considered both semantically segmented as well as instance segmented. For example, segmented cell 760 can be considered semantically segmented in the sense that all the gray-scale pixels in cell 710 of FIG. 7A that are above the image's black background intensity are set to white so as to distinguish it as white foreground relative to image's black background. For example, segmented cell 760 can be considered instance segmented in the sense that it is one instance of many cells of the same class in the whole of image 750.

In various embodiments, classical imaging techniques for cell segmentation are used to detect cell boundaries (e.g., watershed transformation, morphological image processing, Laplacian of Gaussian (LoG) filters, pixel cell classification, etc.). In various embodiments, artificial intelligence (AI) imaging techniques are used for cell segmentation (e.g., U-Net, Mask R-CNN, etc.).

Figure 8A:
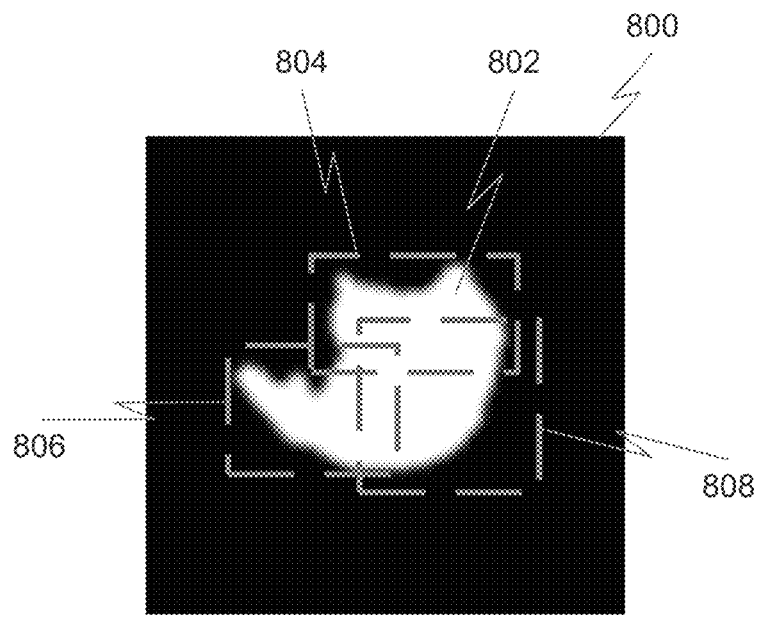
FIG. 8A is a diagram illustrating patch extraction boundaries for an image of a single biological cell using an embodiment of a Fabry-Perot tunable etalon interferometer.

FIG. 8A is a diagram illustrating patch extraction boundaries for an image of a single biological cell using an embodiment of a Fabry-Perot tunable etalon interferometer. In the example shown, image 800 is an image of a THP-1 cell that was segmented and cropped from image 700 of FIG. 7A (i.e., THP-1 cell 802). In some embodiments, individual segmented cells are considered 'cell patches.' For example, patch extraction comprises cropping the one or more images to generate one or more patch images comprising an individual biological cell image and/or a cluster of biological cells image.

In some embodiments, individual segmented cells are cropped into portions (i.e., 'patches') of smaller dimension than the individual segmented cell. For example, cell patch boundary 804, cell patch boundary 806, and cell patch boundary 808 outline only portions of THP-1 cell 802. In the example shown, cell patch boundary 804, cell patch boundary 806, and cell patch boundary 808 are used to crop and extract morphological features of interest from THP-1 cell 802. For example, morphological features of interest (e.g., size, shape, and intensity distribution of illumination) are empirically determined and extracted from each cell patch (e.g., to generate a list of feature metrics for each cell patch). For example, a list of feature metrics deemed significant criteria for identification and the associated statistical thresholds for each that have been established as indicating significance are generated. In some embodiments, features of interest are manually determined by a human user.

In various embodiments, feature extraction is achieved by flattening the cell patches and feeding it pixel by pixel into a fully connected neural network (FCNN) or into a one-dimensional convolutional neural network (1D CNN). In some embodiments, for example when using 2D multichannel patches, a Feature Pyramidal Network (FPN) is used to convolve the input cell patch at multiple scales before flattening features, allowing for scale invariant inputs (e.g., cells of different sizes or images at different magnifications). In various embodiments, the FPN, or other appropriate neural network model, outputs a list of extracted features for each cell patch input. In various embodiments, training the classification algorithm (e.g., a ResNet classification algorithm) uses a diverse assortment of patches from many different images (e.g., patches of individual biological cells or biological cell clusters). For example, depending on the desired level of accuracy for correctly identifying various biological cell types, the diverse assortment of patches comprises 50, 500, 5000, or any other appropriate number of patches required to achieve the desired level of accuracy. For example, training on 50 patches may correctly identify 75-80% of the cell patches, training on 500 patches may correctly identify 98% of the cell patches, and training on 5000 patches may correctly identify 99% or more of the cell patches.

Figure 8B:
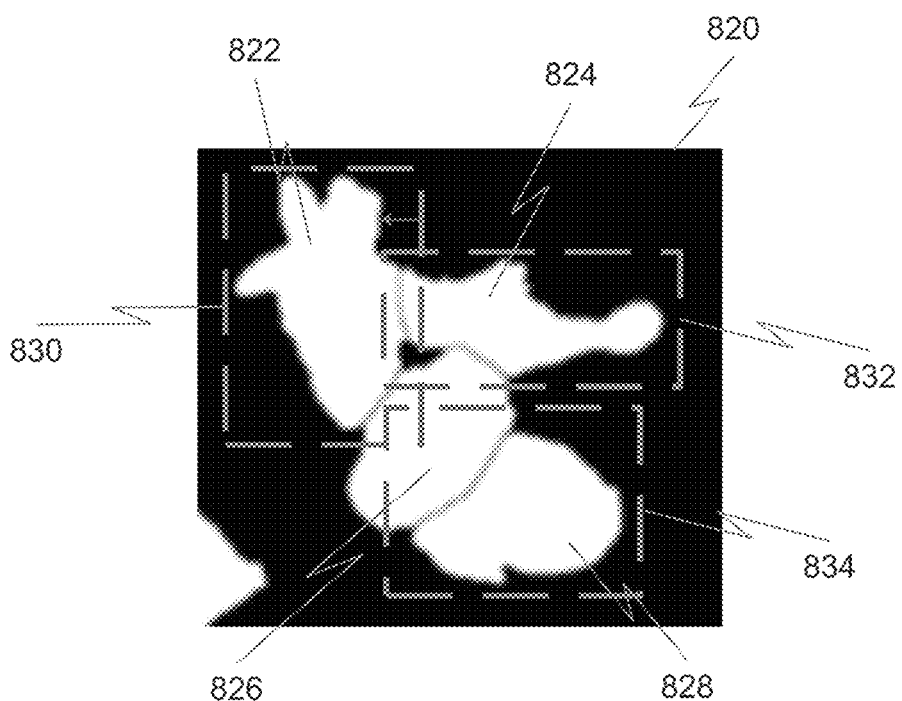
FIG. 8B is a diagram illustrating an embodiment of patch extraction boundaries for an image of a biological cell cluster.

FIG. 8B is a diagram illustrating an embodiment of patch extraction boundaries for an image of a biological cell cluster. In the example shown, image 820 is an image of a THP-1 cell cluster that was segmented and cropped from image 700 of FIG. 7A (i.e., THP-1 cell 822, THP-1 cell 824, THP-1 cell 826, and THP-1 cell 828). In the example shown, cell patch boundary 830, cell patch boundary 832, and cell patch boundary 834 are used to extract individual cell patches from image 820 (i.e., an image of a THP-1 cell cluster). For example, cell patch boundary 830 is used to extract an image of THP-1 cell 822 from the image of the THP-1 cell cluster. The cell patch defined by cell patch boundary 830, can be further sub-divided into smaller patches (e.g., smaller patches comprising features of interest), for example, as illustrated in FIG. 8A.

Figure 9:
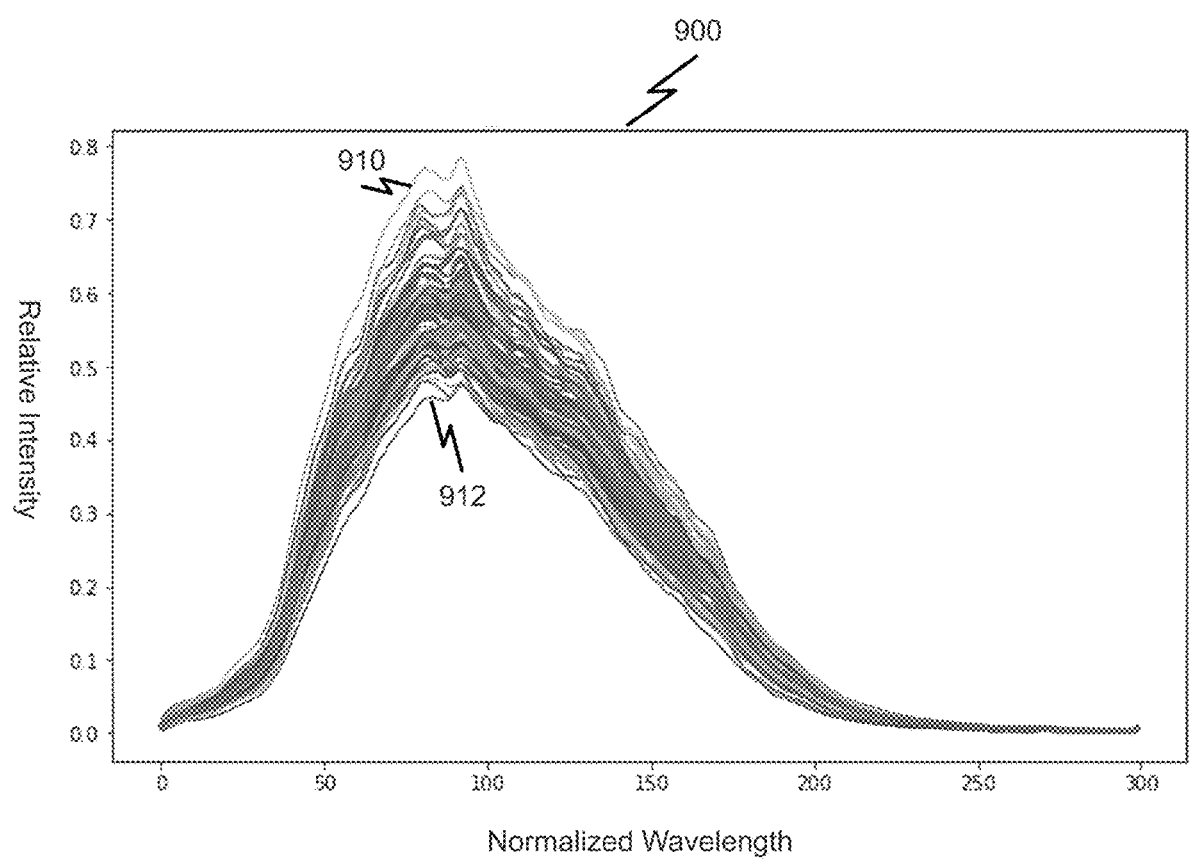
FIG. 9 is a plot illustrating multiple spectra used to generate an average spectrum for *Escherichia coli*.

FIG. 9 is a plot illustrating multiple spectra used to generate an average spectrum for *Escherichia coli*. In the example shown, plot 900 shows a set of individual spectra obtained from multiple *E. coli* cells. In some embodiments, plot 900 is obtained using hyperspectral imaging microscope 300 and computer system 316 of FIG. 3. In the example shown, spectrum 910 was obtained from one *E. coli* cell, spectrum 912 was obtained from an other *E. coli* cell, and so on for the remaining spectra illustrated in FIG. 9. In some embodiments, the multiple spectra of individual biological cells are used to generate an average spectrum (e.g., an average reference spectrum). In some embodiments, the average spectrum comprises a mean average of the amplitude of the spectra (intensity as a function of wavelength) for various cells of the pathogen in the example. In various embodiments, the multiple spectra are averaged using time-domain averaging, vector averaging, root mean square (RMS) averaging, linear averaging, exponential averaging, or any other appropriate method of averaging multiple spectra. In various embodiments, the average spectrum is added to a library of reference spectra, to a library of feature metrics, to a pathogen library, or to any other appropriate library.

Figure 10:
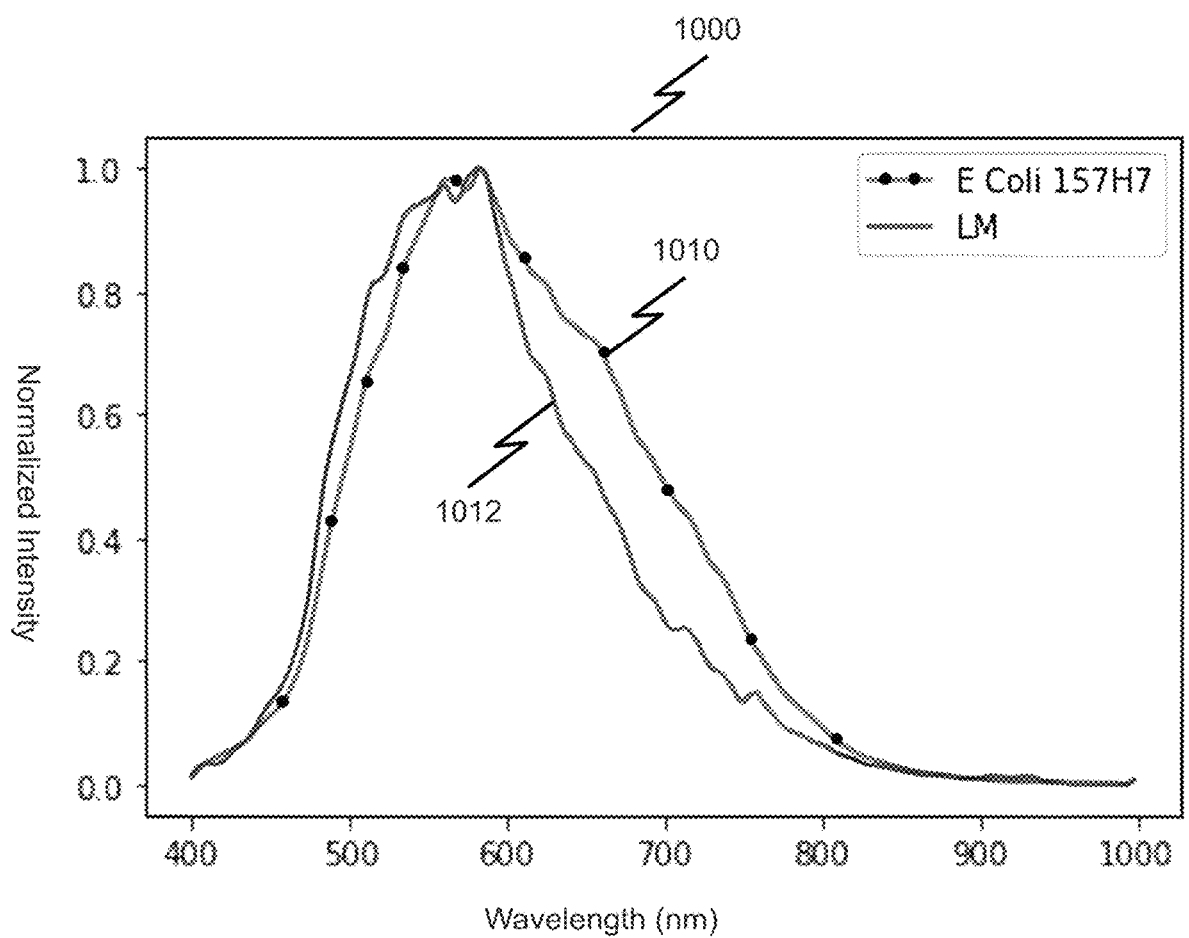
FIG. 10 is a plot illustrating reference spectra for *Escherichia coli* and *Listeria monocytogenes* using an embodiment of a Fabry-Perot tunable etalon interferometer.

FIG. 10 is a plot illustrating reference spectra for *Escherichia coli* and *Listeria monocytogenes* using an embodiment of a Fabry-Perot tunable etalon interferometer. In the example shown, plot 1000 shows an individual reference spectrum for *E. coli* O157:H7 and an individual reference spectrum for *L. monocytogenes* (LM). In some embodiments, plot 1000 is generated from multiple spectra obtained using hyperspectral imaging microscope 300 and computer system 316 of FIG. 3. Normalized reference spectra 1010 was generated from averaging individual spectra obtained from multiple *E. coli* O157:H7 cells. Normalized reference spectra 1012 was generated from averaging individual spectra obtained from multiple LM cells. In some embodiments, the multiple spectra of individual biological cells are used to generate an average spectrum (e.g., an average reference spectrum). In this example, the spectra were averaged over all the cells detected in the field of view of the slide imaged of the pure specimen (reference or "training") samples which is ~100 cells. In various embodiments, the multiple spectra are averaged using time-domain averaging, vector averaging, root mean square (RMS) averaging, linear averaging, exponential averaging, or any other appropriate method of averaging multiple spectra. In various embodiments, the average spectrum is added to a library of reference spectra, to a library of feature metrics, to a pathogen library, or to any other appropriate library.

Figure 11:
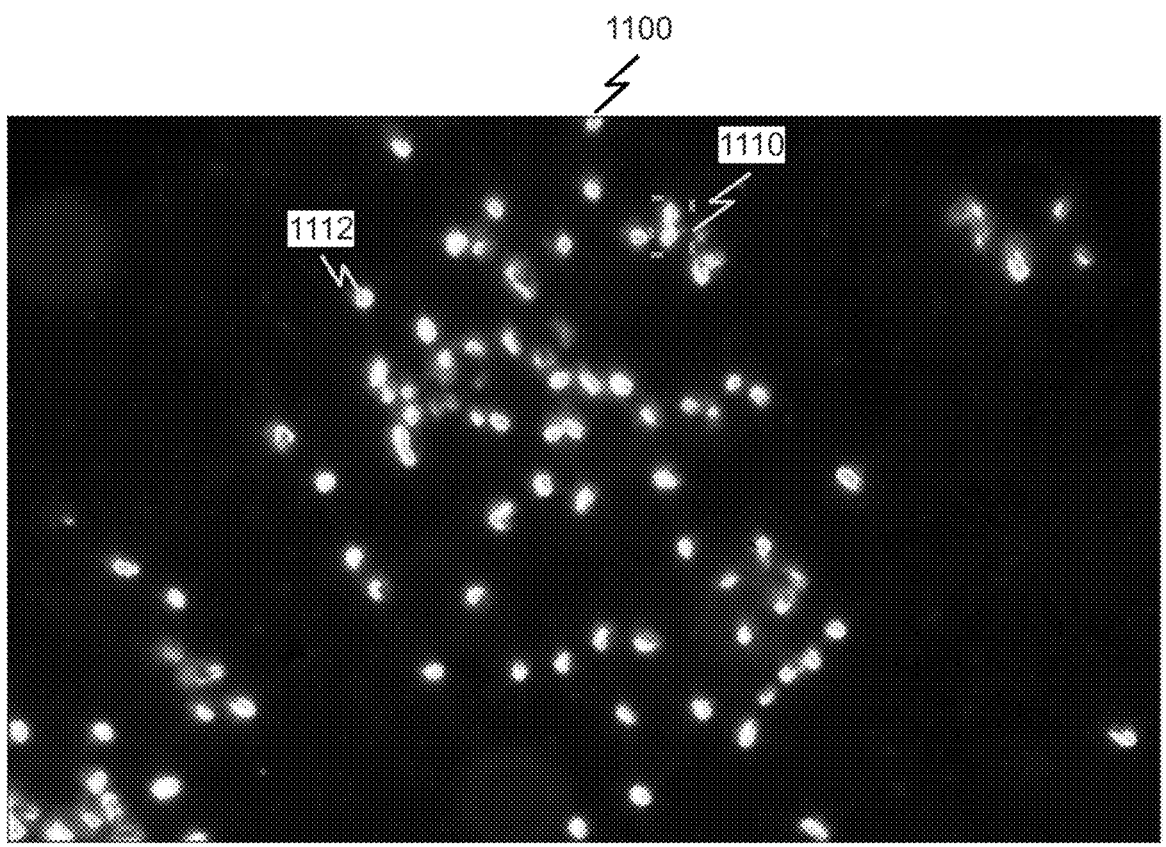
FIG. 11 is an example of a gray-scale rendering of an image of *Escherichia coli* during biological cell typing using an embodiment of a Fabry-Perot tunable etalon interferometer.

FIG. 11 is an example of a gray-scale rendering of an image of *Escherichia coli* during biological cell typing using an embodiment of a Fabry-Perot tunable etalon interferometer. In the example shown, image 1100 is a gray-scale rendering of an image of *E. coli* obtained using the Open Source Computer Vision Library (OpenCV). OpenCV, a tool for image processing and performing computer vision tasks, is a library of programming functions mainly aimed at real-time computer vision. In some embodiments, image 1100 is obtained using hyperspectral imaging microscope 300 and computer system 316 of FIG. 3. Item 1110 is an image of a *E. coli* cell cluster. Item 1112 is an image of a single *E. coli* cell. In some embodiments, the images of the cells shown in image 1100 have been identified as cells using the process of FIG. 6 (e.g., the images of cells shown in image 1100 have been identified as cells above a first threshold confidence value).

Figure 12A:
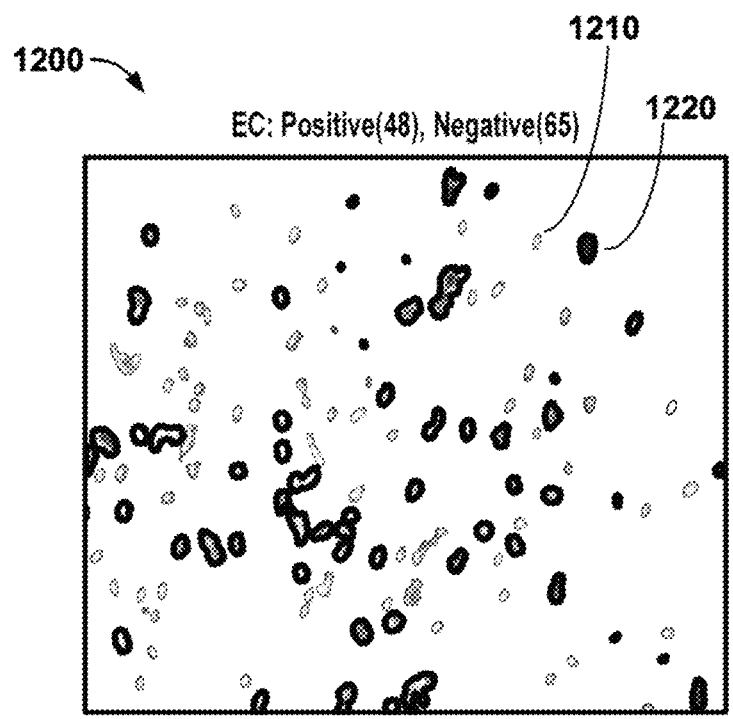
FIG. 12A is an example of a gray-scale rendering of an image of cell-cluster masks identified as *Escherichia coli*.

FIG. 12A is an example of a gray-scale rendering of an image of cell-cluster masks identified as *Escherichia coli*. In the example shown, prediction map 1200 is an image of multiple cells that has been processed to determine a biological cell type (e.g., using the process of FIG. 4). In some embodiments, prediction map 1200 is obtained using hyperspectral imaging microscope 300 and computer system 316 of FIG. 3. In the example shown, prediction map 1200 shows forty-eight (48) cell patches that have been identified as *E. coli* (e.g., cells 1220 and the other cells in bold outline) while sixty-five (65) cell patches have been identified as not *E. coli* (e.g., cells 1210 and the other cells not in bold outline).

In various embodiments, prediction map 1200 is provided to computer memory for storage or is delivered to an application for further processing. In various embodiments, prediction map 1200 is used when training a classification algorithm (e.g., to improve accuracy when analyzing images of similar cells) or when determining a biological cell type from a series of images (e.g., to decrease the time required to determine a particular cell type). In various embodiments, prediction map 1200 is stored in computer memory, and/or saved in a data storage unit (e.g., a data storage unit of the computer system controlling the hyperspectral imaging system). In various embodiments, prediction map 1200 is saved as an image file—for example, a 2D image (e.g., a false color, a gray scale, or another type of image) that shows which cells in the overall image have been classified and their type. In various embodiments, the provided class label for an identified biological cell within prediction map 1200 includes related metadata (e.g., time and date, a level of confidence, the number and/or density of the identified biological cells, a plot or graph of the associated hyperspectral data, etc.). In various embodiments, prediction map 1200 is displayed to a system user as a hyperspectral image (e.g., displayed on a monitor of the controlling computer system) and/or provided to a software application that allows the user to interact with the hyperspectral image. For example, a software application that allows the user to click on a specific pixel, or a specific cell or cell cluster, so as to observe the spectral profile of the chosen region, or to click on an identified biological cell class label so as to observe any related metadata.

Figure 12B:
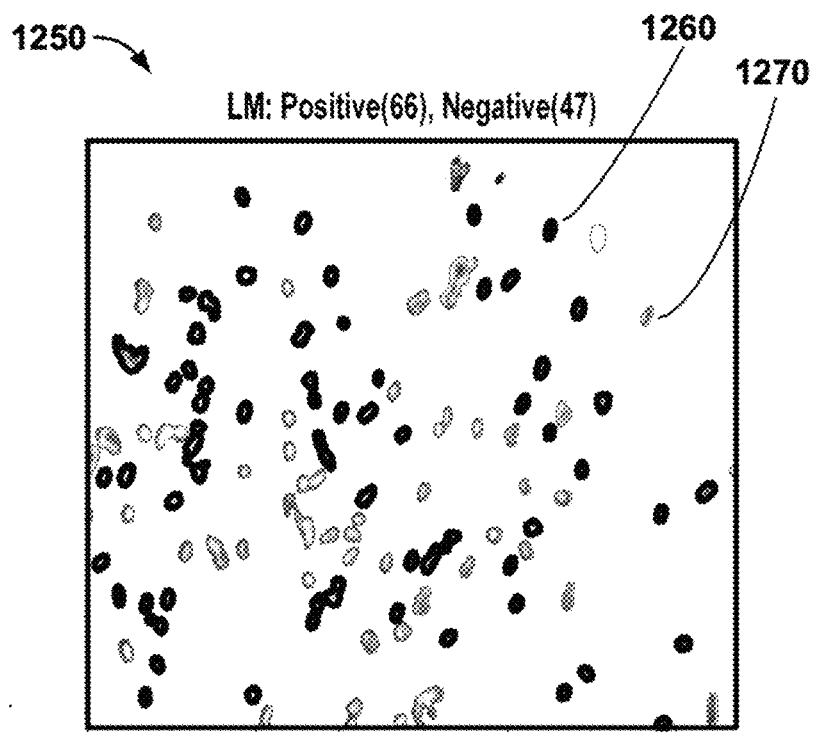
FIG. 12B is an example of a gray-scale rendering of an image of cell-cluster masks identified as *Listeria monocytogenes*.

FIG. 12B is an example of a gray-scale rendering of an image of cell-cluster masks identified as *Listeria monocytogenes*. Prediction map 1250 is an image of multiple cells that has been processed to determine a biological cell type (e.g., using the process of FIG. 4). In some embodiments, prediction map 1250 is obtained using hyperspectral imaging microscope 300 and computer system 316 of FIG. 3. In the example shown, prediction map 1250 shows sixty-six (66) cell patches that have been identified as *L. monocytogenes* (e.g., cells 1260 and the other cells in bold outline) while forty-seven (47) cell patches have been identified as not *L. monocytogenes* (e.g., cells 1270 and the other cells not in bold outline).

In various embodiments, prediction map 1250 is provided to computer memory for storage or is delivered to an application for further processing. In various embodiments, prediction map 1250 is used when training a classification algorithm (e.g., to improve accuracy when analyzing images of similar cells) or when determining a biological cell type from a series of images (e.g., to decrease the time required to determine a particular cell type). In various embodiments, prediction map 1250 is stored in computer memory, and/or saved in a data storage unit (e.g., a data storage unit of the computer system controlling the hyperspectral imaging system). In various embodiments, prediction map 1250 is saved as an image file—for example, a 2D image (e.g., a false color, a gray scale, or another type of image) that shows which cells in the overall image have been classified and their type. In various embodiments, the provided class label for an identified biological cell within prediction map 1250 includes related metadata (e.g., time and date, a level of confidence, the number and/or density of the identified biological cells, a plot or graph of the associated hyperspectral data, etc.). In various embodiments, prediction map 1250 is displayed to a system user as a hyperspectral image (e.g., displayed on a monitor of the controlling computer system) and/or provided to a software application that allows the user to interact with the hyperspectral image. For example, a software application that allows the user to click on a specific pixel, or a specific cell or cell cluster, so as to observe the spectral profile of the chosen region, or to click on an identified biological cell class label so as to observe any related metadata.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a tunable Fabry-Perot etalon;
 an imaging sensor, wherein the imaging sensor acquires one or more images of one or more biological cells from light transmitted through the one or more biological cells and separately through the tunable Fabry-Perot etalon, wherein each image represents a signal associated with one or more wavelengths transmitted through the tunable Fabry-Perot etalon; and
 a processor configured to:
 determine a type of each of the one or more biological cells, wherein determining the type uses a machine learning algorithm, and wherein determining the type is based at least in part on one or more of an image segmentation, a patch extraction, a feature extraction, a feature compression, a deep feature extraction, a feature fusion, a feature classification, and a prediction map reconstruction.

2. The system as in claim 1, wherein the image segmentation comprises delineation of pixels belonging to the one or more biological cells in the one or more images.

3. The system as in claim 2, wherein the delineation of the pixels comprises determining a foreground and a background, and wherein the foreground and the background are used to generate a binary segmentation mask.

4. The system as in claim 3, wherein morphology and contours in the binary segmentation mask are used in determining the patch extraction.

5. The system as in claim 1, wherein the patch extraction comprises cropping the one or more images to generate one or more patch images comprising an individual biological cell image and/or a cluster of biological cells image.

6. The system as in claim 5, wherein the patch extraction generates a cell-cluster mask for each individual biological cell image and each cluster of biological cells image.

7. The system as in claim 6, wherein the feature extraction comprises determining a first set of one or more morphological features of interest from the cell-cluster mask to generate a first list of feature metrics.

8. The system as in claim 7, wherein the feature compression comprises spectrally compressing the cell-cluster mask to generate a compressed cell-cluster mask.

9. The system as in claim 8, wherein the deep feature extraction comprises determining a second set of one or more morphological features of interest from the compressed cell-cluster mask to generate a second list of feature metrics.

10. The system as in claim 9, wherein the feature fusion comprises appending the second list of feature metrics to the first list of feature metrics to generate a complete list of feature metrics.

11. The system as in claim 10, wherein the feature classification comprises determining the type of biological cell in the cell-cluster mask based at least in part on comparing the complete list of feature metrics to a library of feature metrics corresponding to known biological cell types.

12. The system as in claim 11, wherein the prediction map reconstruction comprises associating the type of biological cell in the cell-cluster mask with its location within the one or more images of one or more biological cells.

13. The system as in claim 12, wherein the prediction map reconstruction is used to improve confidence in the type of biological cell determined from the cell-cluster mask by comparing to one or more cell-cluster masks of the individual biological cell image and/or the cluster of biological cells image.

14. The system as in claim 13, wherein determining the type utilizes biological cell shape and/or size information as determined from the cell-cluster mask.

15. The system as in claim 1, wherein the type of each of the one or more biological cells comprises one or more of the following: a eukaryote, a prokaryote, a pathogen, a bacterium, an archaeon, a fungus, a plant, an animal, a human, a protist, a slime mold, a protozoon, an algae, a yeast, a species, a sub-species, a serotype, or a strain.

16. The system as in claim 1, wherein the one or more images are acquired using a microscope.

17. The system as in claim 1, wherein the image sensor comprises a solid-state sensor, a CMOS sensor, a CCD sensor, a staring array, an RGB sensor, an IR sensor, a Bayer pattern color sensor, a multiple band sensor, or a monochrome sensor.

18. The system as in claim 1, wherein the processor utilizes one or more of the following machine learning algorithms to determine the type: a neural network model, a bounding box model, a clustering algorithm, or a classifier algorithm.

19. A method, comprising:
receiving one or more images of one or more biological cells acquired using an image sensor from light transmitted through the one or more biological cells and separately through a tunable Fabry-Perot etalon, wherein each image represents a signal associated with one or more wavelengths transmitted through the tunable Fabry-Perot etalon; and
determining, using a processor, a type of each of the one or more biological cells, wherein determining the type uses a machine learning algorithm, and wherein determining the type is based at least in part on one or more of an image segmentation, a patch extraction, a feature extraction, a feature compression, a deep feature extraction, a feature fusion, a feature classification, and a prediction map reconstruction.

20. A non-transitory computer readable storage medium comprising computer instructions for:
receiving one or more images of one or more biological cells acquired using an image sensor from light transmitted through the one or more biological cells and separately through a tunable Fabry-Perot etalon, wherein each image represents a signal associated with one or more wavelengths transmitted through the tunable Fabry-Perot etalon; and
determining, using a processor, a type of each of the one or more biological cells, wherein determining the type uses a machine learning algorithm, and wherein determining the type is based at least in part on one or more of an image segmentation, a patch extraction, a feature extraction, a feature compression, a deep feature extraction, a feature fusion, a feature classification, and a prediction map reconstruction.

* * * * *